United States Patent
Chaiquin

(10) Patent No.: US 10,680,430 B2
(45) Date of Patent: Jun. 9, 2020

(54) FAULT RECOVERY SYSTEMS AND METHODS FOR ELECTRICAL POWER DISTRIBUTION NETWORKS

(71) Applicants: Meshed Power Systems, Inc., Ottawa (CA); Tikla Com Inc., Parkland, FL (US)

(72) Inventor: Eduardo Chaiquin, Mississauga (CA)

(73) Assignees: TIKLA COM INC., Parkland, FL (US); MESHED POWER SYSTEMS INC., Ottawa, Ontario (CA)

(*) Notice: Subject to any disclaimer, the term of this patent is extended or adjusted under 35 U.S.C. 154(b) by 0 days.

(21) Appl. No.: 15/621,332

(22) Filed: Jun. 13, 2017

(65) Prior Publication Data
US 2017/0358914 A1   Dec. 14, 2017

Related U.S. Application Data

(60) Provisional application No. 62/349,895, filed on Jun. 14, 2016.

(51) Int. Cl.
*H02H 3/06* (2006.01)
*H02H 7/26* (2006.01)
(Continued)

(52) U.S. Cl.
CPC ............ *H02H 3/066* (2013.01); *H02H 3/063* (2013.01); *H02H 7/261* (2013.01); *H02H 7/28* (2013.01);
(Continued)

(58) Field of Classification Search
CPC ..... H02H 3/066; H02H 7/261; H02J 13/0006; Y10T 307/696–766; Y10T 307/615;
(Continued)

(56) References Cited

U.S. PATENT DOCUMENTS 2,284,291 A * 5/1942 May ................. H01H 85/36
337/164
5,274,643 A * 12/1993 Fisk ................. G06F 17/509
340/2.1
(Continued)

FOREIGN PATENT DOCUMENTS

JP        2011155723 A  *  8/2011

OTHER PUBLICATIONS

Brown, "Section 5: System Arrangements", Schneider Electric Design Guide, dated 2006.
(Continued)

*Primary Examiner* — Jarrett J Stark
(74) *Attorney, Agent, or Firm* — Robert C. Netter, Jr.; Dann, Dorfman, Herrell & Skillman

(57) ABSTRACT

Methods and systems for self-healing fault recovery in an electrical power distribution network, particularly distribution networks employing a mesh configuration. When a power source circuit breaker is tripped one or more virtual paths is traced throughout the mesh network, each virtual path originating at the power source that is offline, terminating at an alternate power source, and containing one or two open load switches. A restoration path is chosen from the virtual paths. Power can be transferred to other segments of the mesh network by isolating the fault and closing the open load switch in the chosen restoration path. Some or all of the method and system can be automated.

20 Claims, 23 Drawing Sheets

(51) Int. Cl.
*H02J 13/00* (2006.01)
*H02H 7/28* (2006.01)

(52) U.S. Cl.
CPC ......... *H02J 13/0006* (2013.01); *Y02E 60/725* (2013.01); *Y04S 10/20* (2013.01)

(58) Field of Classification Search
CPC ............... Y10T 307/62; Y10T 307/642; Y10T 307/653; Y10T 307/658; Y10T 307/05
See application file for complete search history.

(56) References Cited

U.S. PATENT DOCUMENTS

| | | | |
|---|---|---|---|
| 6,047,331 A * | 4/2000 | Medard | H04L 45/00 709/239 |
| 6,275,366 B1 | 8/2001 | Gelbien et al. | |
| 6,307,755 B1 * | 10/2001 | Williams | H01L 23/4334 174/260 |
| 6,341,054 B1 | 1/2002 | Walder et al. | |
| 6,697,240 B2 | 2/2004 | Nelson et al. | |
| 6,718,271 B1 | 4/2004 | Tobin | |
| 6,737,762 B2 | 5/2004 | Koenig | |
| 6,907,321 B2 * | 6/2005 | Kearney | H02H 3/063 700/292 |
| 6,914,763 B2 | 7/2005 | Reedy | |
| 6,960,843 B2 | 11/2005 | Yamamoto | |
| 7,406,084 B2 * | 7/2008 | Underwood | H04B 10/2569 370/395.1 |
| 7,535,129 B2 | 5/2009 | Phelps et al. | |
| 7,705,487 B2 * | 4/2010 | Chaiquin | H02J 3/38 307/64 |
| 7,911,944 B2 * | 3/2011 | Chiabaut | H04L 45/00 370/229 |
| 8,010,336 B2 | 8/2011 | Chaiquin | |
| 8,761,022 B2 * | 6/2014 | Chiabaut | H04L 45/12 370/238 |
| 9,088,160 B2 * | 7/2015 | Yang | H02H 7/28 |
| 9,600,790 B2 * | 3/2017 | Mohagheghi | B60L 15/2045 |
| 9,733,659 B2 * | 8/2017 | Yang | G05F 1/66 |
| 2002/0193978 A1 | 12/2002 | Soudier | |
| 2004/0083087 A1 | 4/2004 | Rehtanz et al. | |
| 2004/0153303 A1 | 8/2004 | Tang et al. | |
| 2005/0203722 A1 | 9/2005 | Koo et al. | |
| 2006/0108871 A1 | 5/2006 | Wimmer | |
| 2008/0054373 A1 * | 3/2008 | Chen | H01L 23/49562 257/401 |
| 2008/0124081 A1 * | 5/2008 | Hamada | H04J 14/0212 398/59 |
| 2009/0200864 A1 * | 8/2009 | Maier | B60R 16/0207 307/9.1 |
| 2009/0219696 A1 * | 9/2009 | Nakayama | H02M 7/003 361/709 |
| 2013/0069437 A1 * | 3/2013 | Biallas | H04L 12/413 307/80 |
| 2013/0271941 A1 * | 10/2013 | Guan | H05K 7/18 361/811 |
| 2014/0035120 A1 * | 2/2014 | Nishi | H01L 23/42 257/691 |
| 2014/0321090 A1 * | 10/2014 | Guerin | H02M 7/003 361/782 |
| 2014/0355219 A1 * | 12/2014 | Tada | H05K 1/0263 361/729 |
| 2015/0134135 A1 * | 5/2015 | Wong | H02J 3/38 700/295 |
| 2017/0345799 A1 * | 11/2017 | Rowden | H01L 25/072 |

OTHER PUBLICATIONS

Ceretti et al., "Automatic Fault Clearing on MV Networks With Neutral Point Connected to Ground Through Impedance", 17th International Conference on Electricity Distribution, Barcelona, May 2003.
Flynn, "System Design Considerations", The Grid Modernization Journal, 11th ed., retrieved from <http://www.utilitypost.com/wp-content/uploads/2015/05/Grid-Modernization.pdf>, dated 2013.
S&C Electric Company, "IntelliTeam® SG Automatic Restoration System", Descriptive Bulletin 1044-34, dated Mar. 16, 2015.
SEL Engineering Services, "Distribution Automation Control System", dated 2009.
Survalent Technology, "SmartDMS Distribution Management System", dated 2015.
Smith et al., "Case Study—Improving System Performance Using Distribution Network Automation", Power and Energy Automation Conference, Spokane, Mar. 2015.

\* cited by examiner

FAULT RECOVERY SYSTEMS AND METHODS FOR ELECTRICAL POWER DISTRIBUTION NETWORKS

CROSS-REFERENCE TO RELATED APPLICATION

This application claims the benefit of U.S. Provisional Patent Application No. 62/349,895, filed Jun. 14, 2016, the entire content of which is hereby incorporated by reference.

FIELD

The described embodiments relate to fault recovery methods and systems for electrical power networks and, in particular, to fault recovery in electrical power distribution networks in a mesh configuration.

BACKGROUND

A wide variety of services depend upon the reliable delivery of electrical energy in order to operate efficiently. A wide variety of appliances all rely upon external electrical energy provided by electrical power networks. Consequently, when the network in unable to provide electrical power a variety of infrastructure problems result.

A wide variety of problems lead to a failure to deliver electrical power in a network. In order to provide a flexible solution that supports the bypassing of non-functional power lines it is beneficial to employ an electrical power network with substantial redundancy. Unfortunately, this redundancy often leads to extremely complex network topologies. The complexity of these topologies in turn leads to difficulty in identifying failed components within electrical power network as well as difficulties in safely and efficiently returning power to customers that experience power failures.

SUMMARY

In a first broad aspect, there is provided a method of fault recovery in an electrical power distribution network having a plurality of electrical power sources in a mesh configuration, the method comprising: determining that a first electrical power source of the electrical power distribution network is in a non-conductive state; tracing at least one virtual path, each virtual path originating at the first electrical power source, each virtual path terminating with a respective electrical power source that is unique to the respective virtual path, and each virtual path comprising at least one tie switch associated therewith, the at least one tie switch being less than or equal to a permitted maximum number of tie switches; selecting a restoration path from the at least one virtual path, the restoration path comprising a selected node or segment in the electrical power distribution network; electrically isolating the selected node or segment; restoring the first electrical power source to a conductive state; and configuring the at least one tie switch associated with the restoration path to the conductive state. The permitted maximum number of tie switches may be exactly one, or two.

In some cases, restoring the first electrical power source to a conductive state comprises closing a circuit breaker of the first electrical power source.

In some cases, the at least one virtual path comprises a plurality of virtual paths.

In some cases, the respective unique alternate electrical power source is selected from a plurality of alternate electrical power sources.

Some methods may further comprise detecting a fault at the selected node or segment prior to selecting the restoration path, and wherein the restoration path is selected based on detection of the fault.

In some cases, the restoration path is selected based on detection of the fault.

In some cases, the fault is detected by a fault current indicator.

In some cases, the fault current indicator provides an estimated distance within the electrical power distribution network from the first electrical power source to the fault, further comprising verifying that the estimated distance corresponds within a tolerance to a computed distance between the first electrical power source and the fault.

In some cases, when the estimated distance and the computed distance correspond within the tolerance, the configuration of the at least one load switch to the conductive state and the restoration of the first electrical power source to the conductive state are automatically performed.

In some cases, the restoration path is selected based on one or more load level of each respective alternate electrical power source.

Some methods may further comprise verifying a quantity of the at least one virtual path.

In some cases, the verifying is performed according to the formula $B-E+1$, where $B$ is a branch node count and $E$ is an end node count.

In some cases, the first electrical power source has an associated circuit breaker, and wherein the first electrical power source is restored to the conductive state by closing the associated circuit breaker.

In some cases, the fault is isolated by operating load switches.

In another broad aspect, there is provided an apparatus for automatic fault recovery in an electrical power distribution network having a plurality of electrical power sources in a mesh configuration, the apparatus comprising a memory and a processor, the processor configured to: determine that a first electrical power source of the electrical power distribution network is in a non-conductive state; trace at least one virtual path, each virtual path originating at the first electrical power source, each virtual path terminating with a respective unique alternate electrical power source, and each virtual path comprising at least one load switch associated therewith and pre-configured to a non-conductive state, the at least one tie switch being less than or equal to a permitted maximum number of tie switches; select a restoration path from the at least one virtual path, the restoration path comprising a selected node or segment in the electrical power distribution network; electrically isolate the selected node or segment; configure the at least one load switch associated with the restoration path to the conductive state; and restore the first electrical power source to a conductive state.

In some cases, the processor is further configured to detect a fault prior to selecting the restoration path, and wherein the restoration path is selected based on detection of the fault.

In some cases, the restoration path is selected based on detection of the fault.

In some cases, the fault is detected by a fault current indicator.

In some cases, the fault current indicator provides an estimated distance within the electrical power distribution network from the first electrical power source to the fault, and wherein the processor is further configured to verify that the estimated distance corresponds within a tolerance to a computed distance between the first electrical power source and the fault prior to configuring the at least one tie switch to the conductive state.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
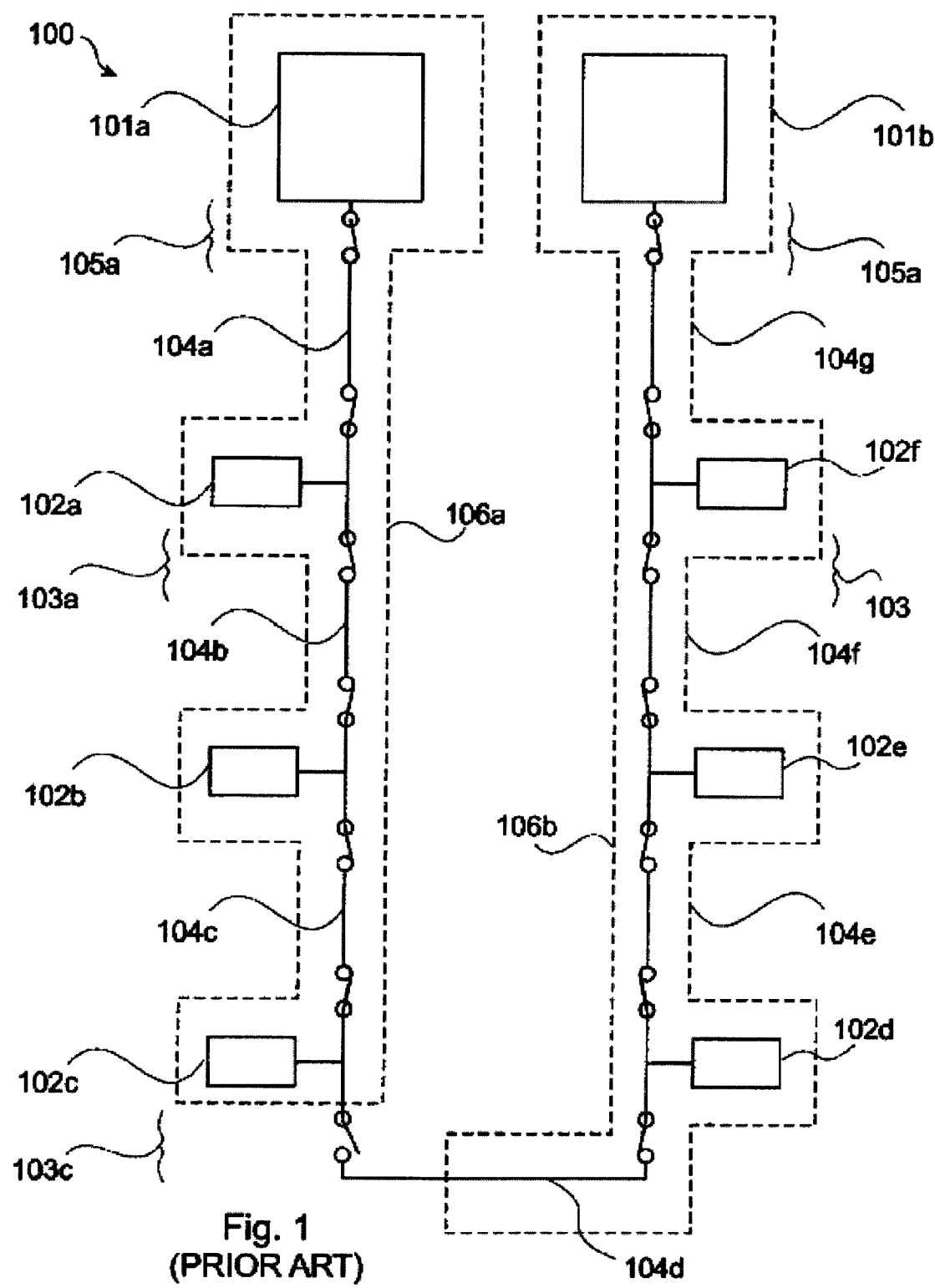
FIG. 1 is a prior art electrical power network.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

The described embodiments generally provide a fast and efficient solution to self-healing fault recovery in electrical power distribution networks of arbitrary size and complexity, such as configurable medium voltage electrical mesh networks in which a medium voltage is typically in the range of 1 kilovolt (kV) to 44 kV. Although generally described with respect to medium voltage networks, the described approach also can be applied to other electrical mesh networks. The described embodiments may be implemented and operated with conventional computing devices. Moreover, the described embodiments ensure that a suitable response to a fault can be identified and implemented very quickly, regardless of network size or complexity, as even brief disruptions to the electrical power systems in most cities represent a significant loss in productivity and a potential danger to its inhabitants.

It is well known and understood in the art that a short circuit to an electrical ground will act to absorb electrical power. When a consumer is provided electricity from a same source via two different but connected paths a short circuit in either path will prevent the delivery of electricity via either of the two paths. Accordingly, it is not common practice to make simultaneous use of redundant paths for providing electrical power from the same, or from different, sources.

Referring to FIG. 1, an electrical power network 100 according to the prior art is shown. The network transfers electrical energy from sources 101a and 101b to consumers 102a to 102f. Each of the consumers 102a to 102f is connected to the electrical power network 100 via a set of load switches 103. The load switches 103 selectively electrically couple the consumers 102a to 102f to power lines 104a to 104g. In addition, circuit breakers 105a and 105b are provided electrically proximate the sources 101a and 101b. Since the load switch 103c is shown in a non-conducting state it is clear that electrical energy propagating along power line 104c will not be permitted to propagate in power line 104d and vice versa. In this way, a ring topology is broken into two electrically isolated paths 106a and 106b. When a fault occurs in line segment 106a the consumers 102d to 102f associated with line segment 106b continue to receive electrical power. In addition, once the fault in line segment 106a has occurred it is relatively easy matter to determine a relative location of the fault by making use of fault current indicators and feeder protection relays, and reconfigure the grid by opening load switches and selectably closing the load switches. Such techniques are well understood in the art. In this instance, this technique benefits from the fact that the electrical energy propagates to any specific location within the network via one and only one path when the network is suitably configured. A person of skill in the art will appreciate that once the fault has been isolated, it is a relatively simple matter to dispatch technical professionals to reset some of the load switches 103 to provide power to all the consumers 102a to 102f while electrically isolating the fault.

Figure 2:
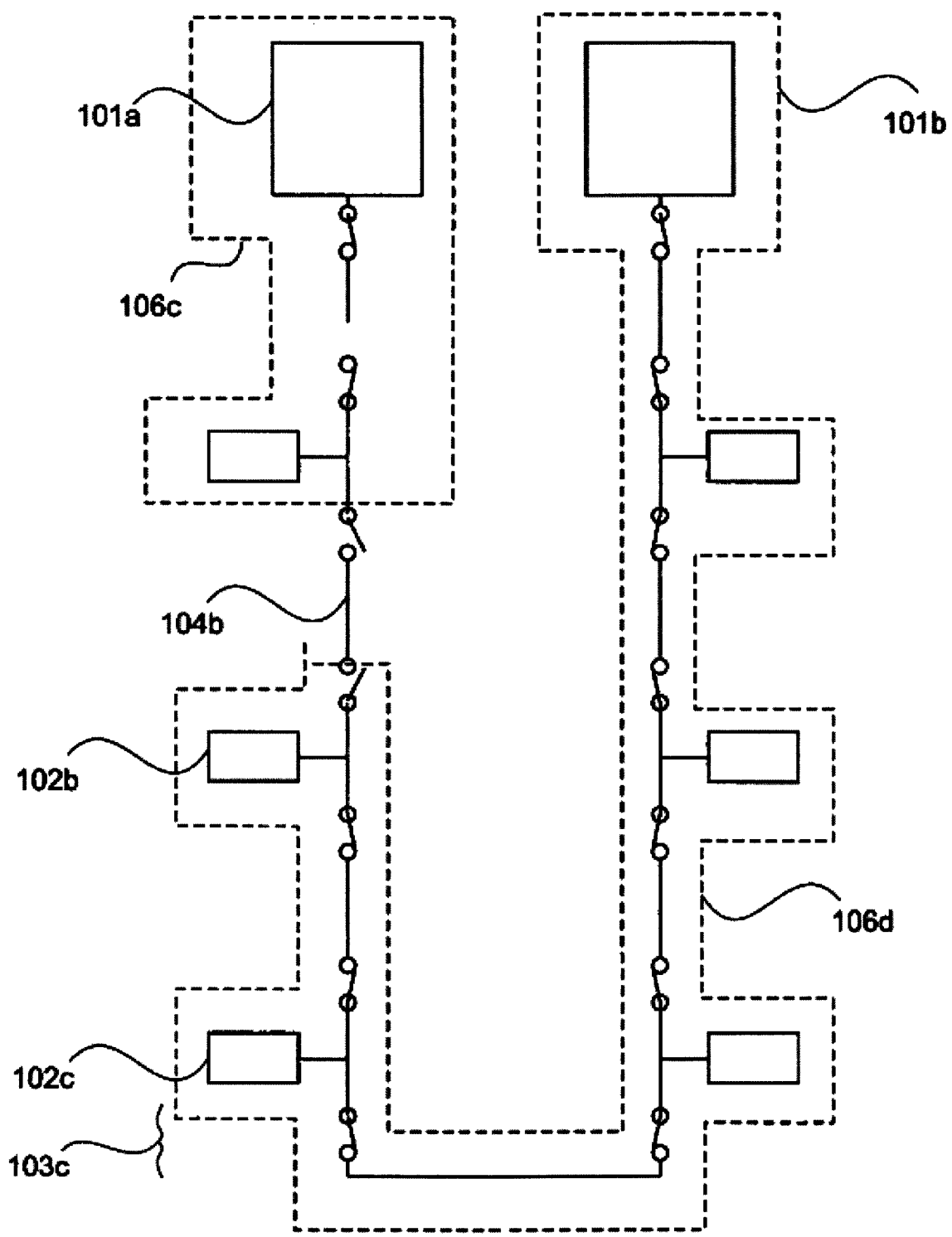
FIG. 2 is the prior art electrical power network of FIG. 1 with an electrically isolated faulty link.

Referring to FIG. 2, the electrical power network 100 of FIG. 1 is shown with power line 104b electrically isolated from the remainder of the electrical power network 100. The load switches 103 electrically adjacent power line 104b are shown in a non-conducting state. In order to ensure that consumers 102b and 102c receive power, the load switch 103a is in the closed position. Thus, consumers 102b and 102c are receiving power from source 101b. This change in state of the load switches 103 and 103a results in two new electrical paths 106c and 106d.

Figure 3:
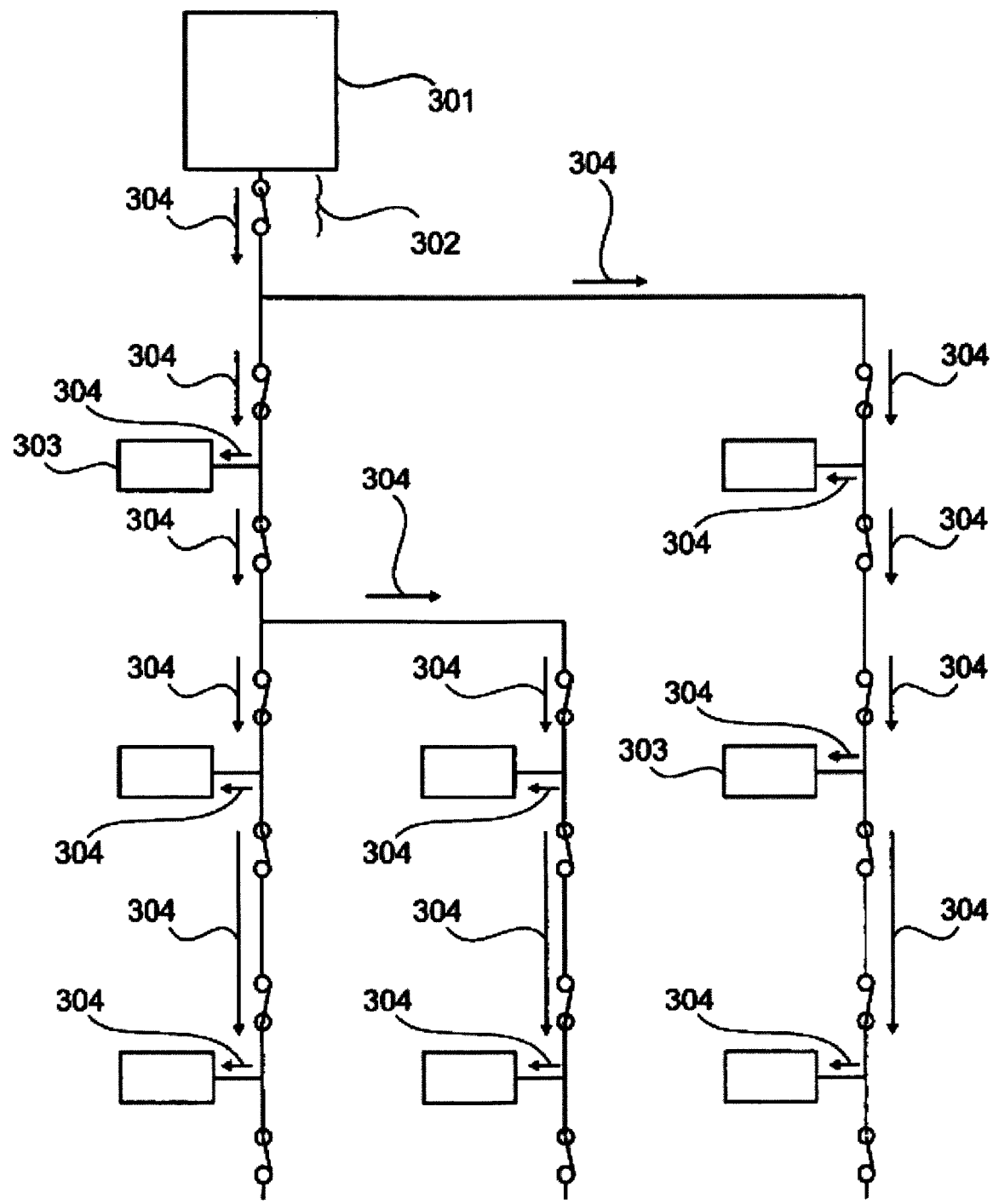
FIG. 3 is a prior art network featuring multiple branches.

A person of skill in the art will also appreciate that other topologies of electrical grids are sufficiently simple that isolating faults within them is trivial. For example, referring to FIG. 3, a simple electrical network 300 in accordance with the prior art is shown. The network comprises a source 301, breakers 302, and consumers 303. As will be apparent to one of skill in the art, to the extent that electrical power is only able to flow in one direction from a specific source to a specific consumer it is a relatively simple task to determine a relative location of a fault between that source and that consumer despite the presence of multiple branches in the electrical network 300. Thus, a direction of electrical energy propagation is associated with each of the links. Arrows 304 indicate this direction of energy propagation within the network 300.

Modern electrical power networks are typically designed as mesh networks. Nodes in a mesh network may be characterized by the number of edges or segments to which they are connected. Generally, each edge represents a degree. Therefore, a node connected to one segment is described as a node of degree one. A node connecting two segments is described as a node of degree two. Similarly, nodes connecting three segments are described as nodes of degree three, and so on. Nodes connecting four or more links can be characterized as nodes of four or more, respectively. However, nodes of degree four or more can be reduced conceptually to multiple nodes of degree three. That is, a node of degree four can be reduced to two nodes of degree three.

Like the simple network of FIG. 1, within a mesh network it is desirable to ensure that a given consumer is supplied by only one power source via an electrical path with a clear direction of electrical energy flow absent any redundant electrical paths. Unfortunately, when a fault occurs within a complicated mesh network, it is often very difficult to generate a new set of electrical paths that provides electrical power to all consumers while avoiding the detected fault within the mesh network. The described embodiments support both easy identification of faulty elements of a complex mesh network, and identifying suitable paths for fault recovery within complex suitably designed mesh networks.

Previous attempts at fault recovery have generally attempted to find all possible virtual paths for restoration, however the complexity involved in finding all virtual paths for the whole network increases non-linearly with the number of T-nodes (also referred to as branch nodes), leading to impractically long search times.

The described embodiments provide an improved approach that allows for a reduction in the scope of a search thereby facilitating a search for virtual paths that can be performed convergent in real-time when the grid is operating in a normal configuration. A normal configuration refers to a configuration of the grid in which a subset of load switches is configured or preconfigured in the open position.

Figure 4A:
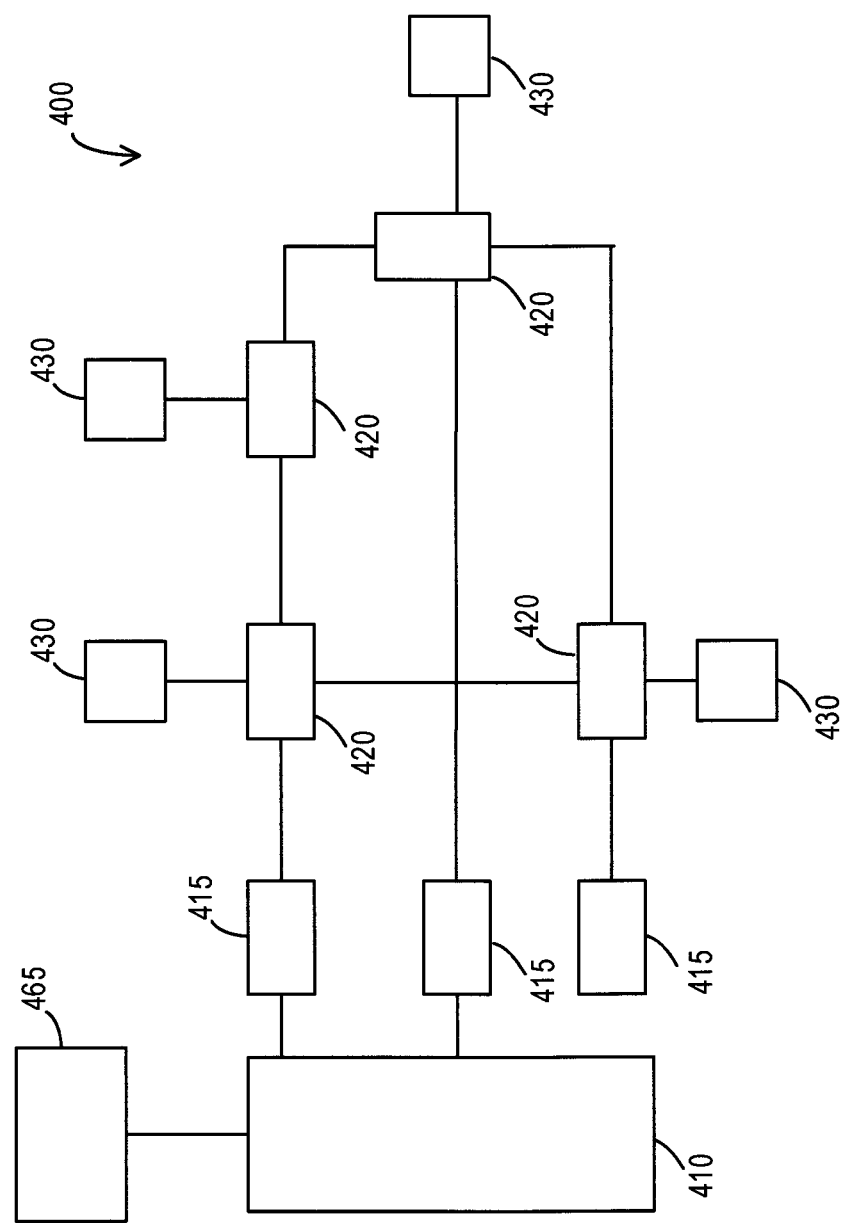
FIG. 4A is a schematic diagram of one example electrical power distribution network in accordance with some embodiments.

Referring now to FIG. 4A, there is illustrated a schematic diagram of one example electrical power distribution network in accordance with some embodiments. Electrical power distribution network 400 has a control center 405, one or more substations 410 each with one or more feeders 415, a plurality of remote terminal units (RTUs) 420 at each node in the network, and a plurality of loads 430. It will be appreciated that a wide variety of combinations, configurations and electrical interconnections are contemplated. Accordingly, there may be different numbers of substations 410, feeders 415, RTUs 420 and loads 430 than shown in FIG. 4A.

FIG. 4A illustrates electrical connections between the various elements of electrical power distribution network 400. However, in some cases, there may be data communication between the elements of network 400 and, in particular, between control center 405 and the other elements of network 400. In some cases, data communication may be carried via electrical power lines. In other cases, data communication may be carried out-of-band via dedicated wired connections (e.g., optical networks) or wirelessly. In some cases, communications may be relayed by elements. For example, a substation 410 may relay data communications from control center 405 to one or more RTUs 420 via a feeder 415.

Figure 4B:
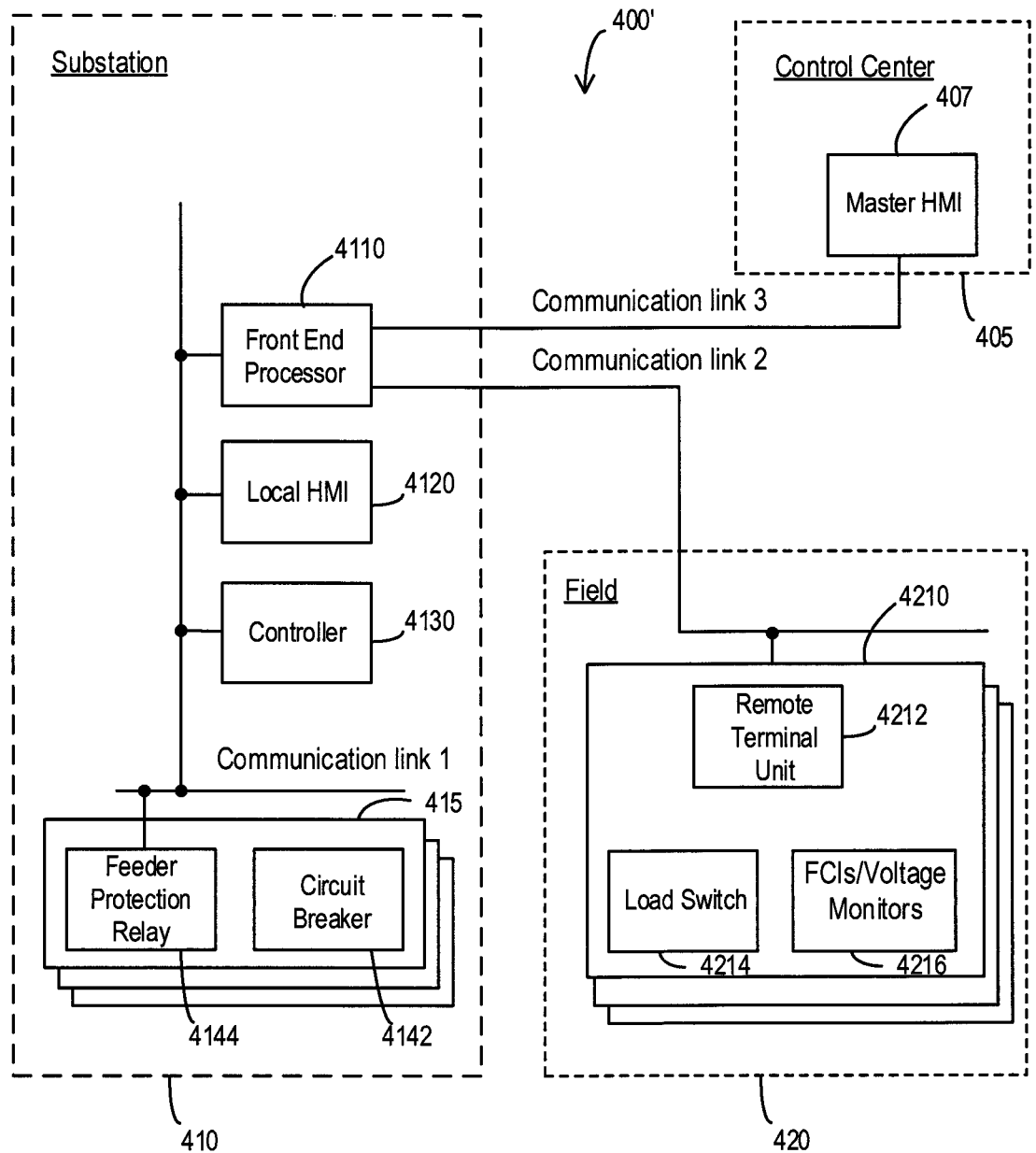
FIG. 4B is an example schematic diagram of a remote monitoring and control network for a network as in FIG. 4A.

Referring now to FIG. 4B, there is illustrated an example schematic diagram of a remote monitoring and control network 400' for communicatively coupling the elements of a network 400 as in FIG. 4A. The remote monitoring and control network 400' may be, for example, a supervisory control and data acquisition (SCADA) network, used to monitor the electrical power distribution network 400 of FIG. 4A.

Network 400' illustrates an example architecture, where the controller 4130, based at a substation 410, is responsible for grid reconfiguration. In some cases, the programs executed by controller 4130 may also be executed by a corresponding controller at a control center 405. In some cases, grid reconfiguration may be performed from the control center 405, bypassing substation control.

Control center 405 can be communicatively coupled to one or more substation 410 via a communication link, such as a wireless data link or a dedicated communication link. Each substation 410 in turn can be communicatively coupled to one or more RTU 420 in the electrical power distribution network (e.g., network 400) via a feeder 415.

A control center 405 generally has at least one human-machine interface (HMI) 407, which is a computing device that can process and present remote monitoring and control data to a supervisory user, and accept control inputs from the supervisory user. HMI 407 generally has a processor, a memory, input and output devices such as keyboards and displays, and at least one communication interface. A control center 405 may also have at least one master controller (not shown), similar to controller 4130 that can be found in a substation 410.

In operation, HMI 407 of control center 405 receives monitoring and control information from substation 410 or from a master controller. In some cases, HMI 407 or a master controller may automatically determine control actions to be taken based on received monitoring and control information, and issue control commands for substations 410, feeders 415 or RTUs 420. In other cases, human intervention may be desired, in which case HMI 407 may process the control and monitoring information and display appropriate notifications, information and control options to the supervisory user, for further action.

Each substation 410 generally has a front end processor 4110, a local HMI 4120, a controller 4130, and one or more feeders 415. Each feeder 415 can feed a circuit of network 400, and generally has a feeder protection relay 4144 and a circuit breaker 4142. A feeder 415 can also be referred to as a "source" (e.g., as that term is used with reference to FIGS. 1 to 3).

A circuit breaker 4142 at feeder 415 is generally a medium voltage circuit breaker, able to interrupt short circuit currents on the order of 10 kA. A circuit breaker 4142 generally is tripped by a corresponding feeder protection relay 4144 when short circuit current exceeds a predetermined level.

Each feeder protection relay 4144 can control the operation of circuit breaker 4142, and can provide control and monitoring information to controller 4130. Control and monitoring information from a feeder protection relay 4144 can include, but is not limited to, information such as feeder current measurement, trip indication, distance-to-fault estimation, and a circuit breaker status (e.g., OPEN, CLOSED, ALARM). Each feeder protection relay 4144 can also receive commands from controller 4130, for example to open or close circuit breaker 4142.

A front end processor 4110 can be a processor that handles data communication with control center 405 and RTUs 420. Local HMI 4120 is generally analogous to master HMI 407, although the scope of control and monitoring information it receives, and the commands it issues, can be more limited.

Controller 4130 is a computing device with a processor, memory and communication interface, which interprets commands from local HMI 4120 and master HMI 407, and issues equipment-specific commands to feeder protection relays 4144 and to RTUs 420. Controller 4130 may be provided with executable program code, which, when executed by the controller, causes the controller to carry out some of the methods and processes described herein. In practice, a supplier of SCADA remote monitoring and control equipment, such as Star Controls, Inc. of Coral Springs, Fla., may provide the equipment and program code.

In some cases, HMI 407 or HMI 4120 may carry out some of the described acts. It will be appreciated that the functions of controller 4130 and HMI 4120 may be further subdivided or integrated in various embodiments.

RTUs 420 can be provided throughout a circuit, usually in proximity to load switches or sensor, thereby providing the ability to isolate circuit segments and loads.

An RTU 420 generally has a remote terminal unit 4212 which can communicate with and receive commands from a controller 4130. Additionally, an RTU 420 generally is provided proximally to a load switch 4214 that can be opened or closed, or one or more fault current indicators (FCIs) or voltage monitors, or both.

Accordingly, an RTU 420 can report to controller 4130 a load switch status (e.g., OPEN, CLOSE, ALARM), or whether fault current is detected, or a voltage measurement at the voltage monitor connected to the RTU. Likewise, an RTU 420 can receive commands from controller 4130 to operate a load switch 4214 (e.g., to open or close the switch).

In contrast to a circuit breaker 4142, a load switch is installed in the field (e.g., mounted on an overhead pole) generally only able to interrupt nominal current of about 600 A. Typically, a load switch 4214 has or may be furnished with a corresponding FCI or/and voltage monitor.

In some cases, disconnect switches (not shown) may be used in lieu of load switches. Disconnect switches generally are less expensive than load switches, but lack the ability to operate under load and often lack the capability for automated operation. However, in some embodiments, disconnect switches can be used in combination with a manual operation approach. Otherwise, disconnect switches can be ignored and treated as open or closed circuits, depending on the current configuration.

Figure 5:
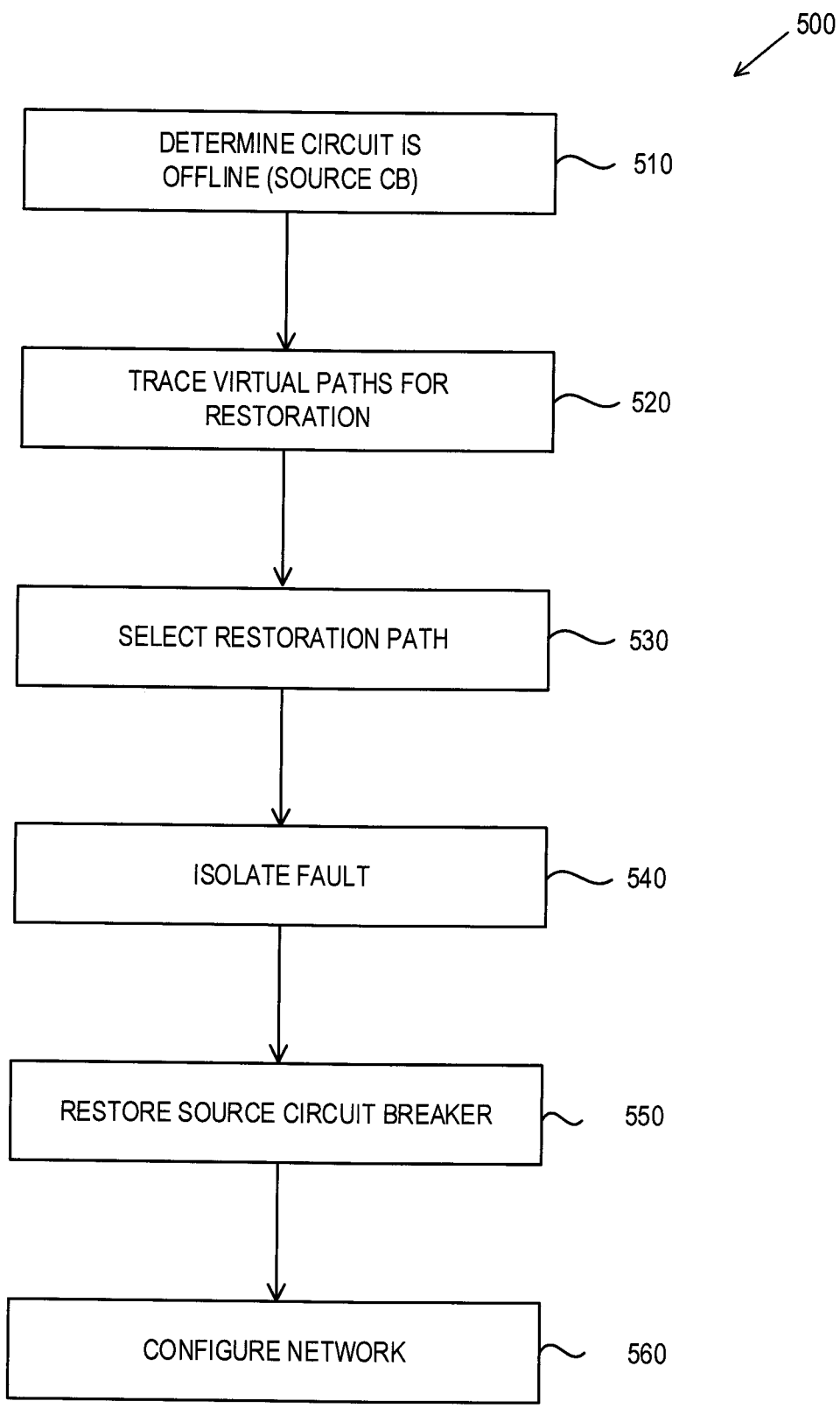
FIG. 5 is a process flow diagram for an example method of fault recovery in an electrical power distribution system in accordance with at least some of the described embodiments.

Referring now to FIG. 5, there is illustrated an example method of fault recovery in an electrical power distribution system in accordance with at least some of the described embodiments. Fault recovery method 500 can be carried out in an electrical power distribution network such as network 400, and is generally applicable to power distribution systems having a mesh configuration. It will be appreciated that the method may be applied in any configuration in which there are possible redundant power sources to feed one or more nodes.

Fault recovery method 500 begins at 510, with a controller, such as controller 4130 at a substation 410, determining that a first electrical power source of the electrical power distribution network, such as a feeder 415, is in a non-conductive state. The controller may determine that the first electrical power source is in the non-conductive state, for example, by receiving a signal that a circuit breaker associated with the first electrical power source (e.g., a circuit breaker 4142) has been tripped, causing the circuit to open. The circuit breaker, in turn, may have been tripped due to an over-current condition, which may be detected by a protection relay.

In practice, a fault can occur at a node (e.g., if a utility pole upon which a load switch is mounted is physically damaged) or along a segment connected to a node (e.g., if a tree falls onto an overhead power line), or in some cases multiple faults can occur. Both cases are referred to herein simply as "faults" unless noted otherwise.

At 520, the controller begins determining or tracing at least one virtual path in the electrical power distribution network. Each virtual path is traced from an origin at the first electrical power source to a termination at an alternate electrical power source, such as another feeder 415, elsewhere in the electrical power distribution network. In some embodiments, the controller ensures that each virtual path has exactly one segment that is configured to be non-conductive or open during normal operation (i.e., prior to detection that a fault has occurred, or a circuit breaker has tripped)—this may be referred to as a "first order" restoration process. Such preconfigured open segments may be open due to open load switches, which also are referred to herein as tie switches. A segment of the network that is terminated at a tie switch is referred to herein as a tie segment.

In some embodiments, the controller may permit each virtual path to have two segments configured to be non-conductive or open during normal operation. This may be referred to as a "second order" restoration process, and may be used, for example, where the controller determines that there are no acceptable virtual paths available using a first order restoration process, e.g., because the electrical power sources for the virtual paths found in a first order process cannot support the additional load that would result if the virtual path is selected as a restoration path. In general, the controller will prefer first order virtual paths to second order virtual paths, since it is less computationally expensive to identify first order virtual paths.

As described above, electrical power distribution networks and mesh networks in particular, are generally designed to contain one or more load switches (tie switches) in an open state during normal operation. This serves to isolate portions of the network from faults, and also to facilitate recovery.

When tracing each virtual path, the controller traverses electrical nodes, links or segments capable of electrical contiguity with the first electrical power source, regardless of their present state. For example, a tie switch may form part of a virtual path if it is capable of being closed to form a contiguous electrical connection. Likewise, a fault may be traversed in the network graph as part of tracing virtual paths.

In most properly designed mesh networks, there will be one or more virtual paths available for each electrical source and fault location. An efficient approach, capable of application to mesh networks of arbitrary size and complexity, and to providing verifiable solutions identifying all possible virtual paths is described herein. In some embodiments, the approach reduces the graph traversal problem associated with complex mesh networks by imposing important constraints on the search, most notably by limiting each virtual path to having only one tie switch, and by limiting each tie switch to inclusion in just one virtual path. In some other embodiments that allow a second order restoration processes, virtual paths may be permitted to have more than one tie switch where there are no suitable virtual paths with just one tie switch (suitability being determined according to other considerations, such as load size).

Once the virtual paths have been traced, one of the virtual paths is selected from among the at least one virtual path, and designated as a restoration path at 530. The restoration path includes a selected fault to be electrically isolated. The restoration path may be selected from among multiple possibilities in several ways. For example, in one approach, the controller may select a restoration path that includes an electrical power source that is least loaded (e.g., has the most available power), and therefore able to take on the additional load once the circuit is restored. Other approaches may be based on power availability, source proximity, maintenance considerations, load forecast, hierarchy, or some combination thereof.

At 540, the selected node (or segment) is electrically isolated, for example by opening both load switches nearest to the selected node or by opening electrical switches at the selected segment's end. The load switches may be switches (e.g., medium voltage load switches) that are remotely operable in response to a signal from the controller. However, in some cases the switches may be opened manually. In the event of a malfunction or failure to open a load switch, the controller may elect to open the load switch found in the virtual path selected for restoration closest to the failed load switch.

Once the selected node or segment is electrically isolated, the first electrical power source can be restored to operation at 550, for example by closing the associated circuit breaker.

Finally, the tie switch associated with the restoration path can be signaled to close at 560, causing it to transition to the conductive state and configuring the network for resumed operation. In embodiments that allow a second order restoration process, at 560 the network may undergo additional reconfiguration as described further herein (e.g., with respect to FIGS. 10A to 10E), to electrically isolate parallel power sources and close switches along the selected restoration path.

Figure 6:
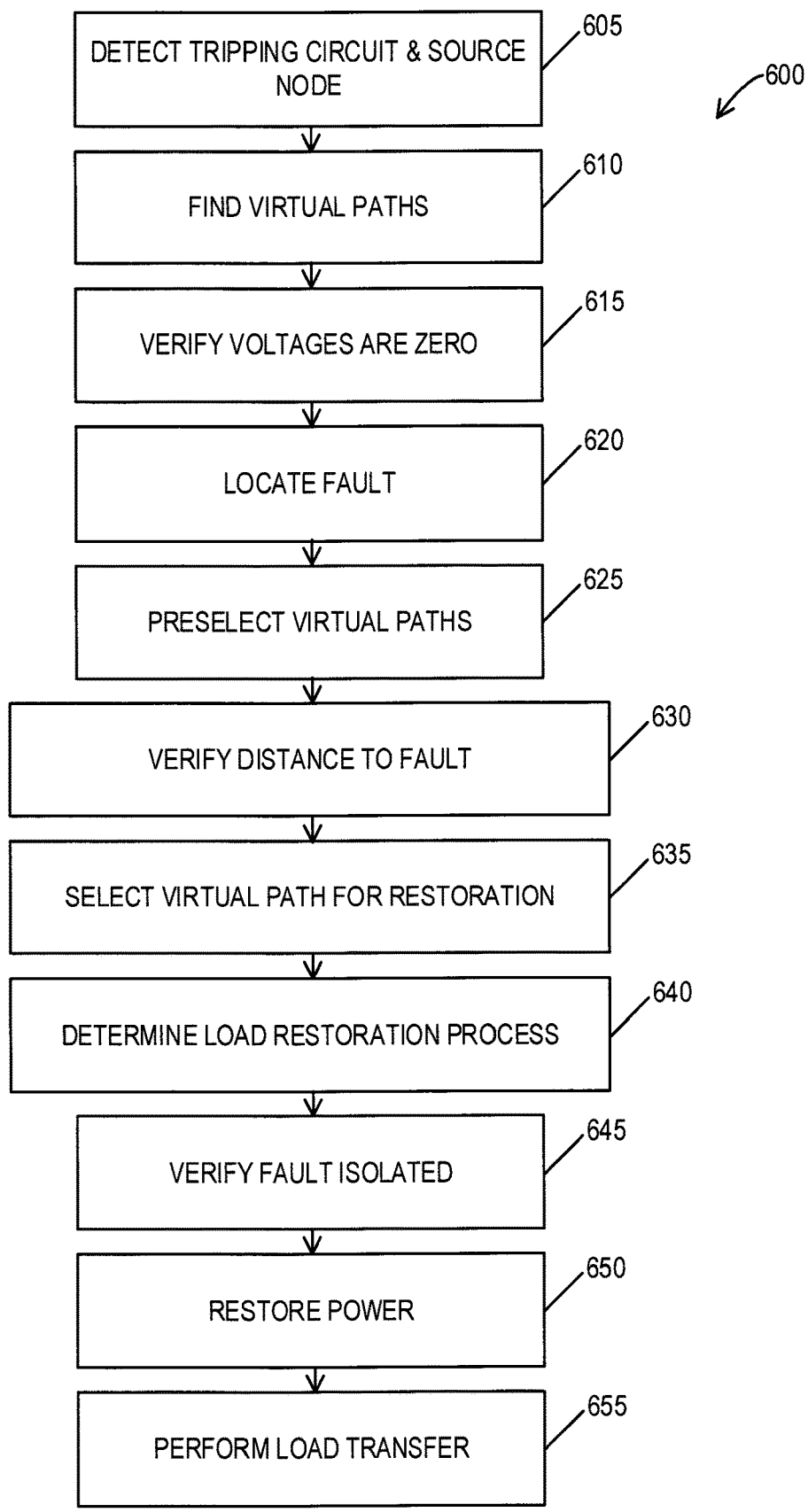
FIG. 6 is a process flow diagram for another example method of fault recovery in an electrical power distribution system in accordance with at least some of the described embodiments.

Referring now to FIG. 6, there is illustrated a more detailed example method of fault recovery in an electrical power distribution system in accordance with at least some of the described embodiments. Fault recovery method 600 also can be carried out in an electrical power distribution network such as network 400, and is generally applicable to power distribution systems having a mesh configuration.

Fault recovery method 600 begins at 605, with a controller, such as controller 4130 at a substation 410, determining that a first electrical power source of the electrical power distribution network, such as a feeder 415, is in a non-conductive state. The controller may determine that the first electrical power source is in the non-conductive state, for example, by receiving a signal that a circuit breaker associated with the first electrical power source (e.g., a circuit breaker 4142) has been tripped, causing the circuit to open. The circuit breaker, in turn, may have been tripped due to an over-current condition, which may be detected by a protection relay.

At 610, the controller begins determining or tracing virtual paths in the electrical power distribution network that have one open switch. Each virtual path is traced from an origin at the first electrical power source to a termination at an alternate electrical power source, such as another feeder 415, elsewhere in the electrical power distribution network. In some embodiments, the controller ensures that each virtual path has exactly one tie switch (e.g., open load switch, tie or open segment) that is configured to be non-conductive or open during normal operation (i.e., prior to detection that a fault has occurred, or a circuit breaker has tripped). In other embodiments, the controller may permit virtual paths to have two or more tie switches, e.g., where there are no suitable virtual paths with only one tie switch.

As described above, electrical power distribution networks and mesh networks in particular, are generally designed to contain one or more load switches in an open state during normal operation. This serves to isolate portions of the network from faults, and also to facilitate recovery.

When tracing each virtual path, the controller traverses electrical nodes, links or segments capable of electrical contiguity with the first electrical power source, regardless of their present state. For example, an open tie switch may still form part of a virtual path if it is capable of being closed to form a contiguous electrical connection. Likewise, a fault may be traversed in the network graph as part of tracing virtual paths.

In most properly designed mesh networks, there will be one or more virtual paths available for each electrical source and fault location. An efficient approach, capable of application to mesh networks of arbitrary size and complexity, and to providing verifiable solutions identifying all possible virtual paths is described herein. As noted above, in some embodiments, the approach reduces the graph traversal problem associated with complex mesh networks by imposing important constraints on the search, most notably by limiting each virtual path to having only one tie switch, and by limiting each tie switch to inclusion in just one virtual path. In some other embodiments, virtual paths may be permitted to have more than one tie switch where there are no suitable virtual paths with just one tie switch (suitability being determined according to other considerations, such as load size).

At 615, the controller ensures that all nodes in virtual paths with an open load switch have a zero voltage measurement, for example, by querying voltage monitors in respective RTUs.

At 620, the location of a fault is determined, for example by querying FCIs in respective RTUs. For example, if a fault has occurred at a fifth node within a circuit, as measured from a particular source feeder, fault current may have been detected at all four intermediate nodes from the tripped circuit breaker to the fifth node.

Figure 9:
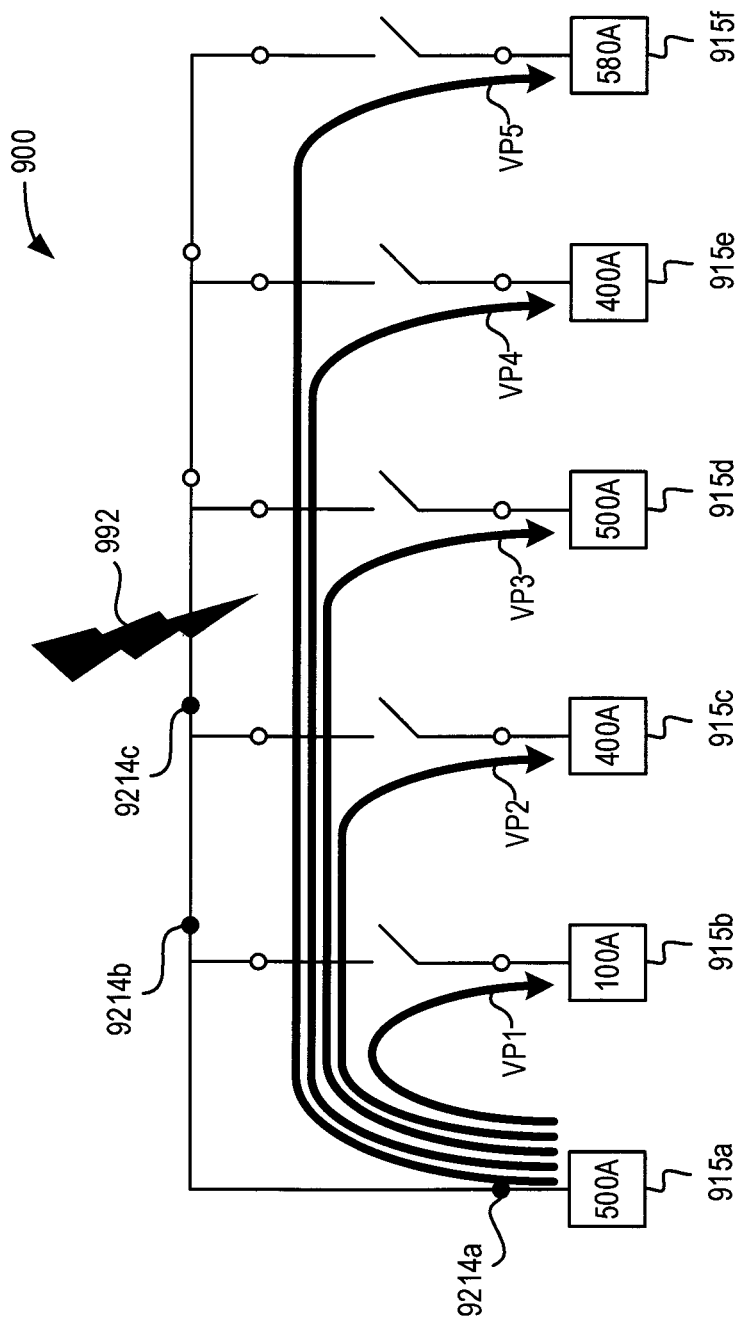
FIG. 9 illustrates one example of the preselection process for a simplified network.

At 625, the controller may preselect those virtual paths that present the fault at the farthest distance from the first electrical power source. For example, the controller may preselect those virtual paths that include the greatest number of nodes or segments for which FCIs have operated. FIG. 9 illustrates one example of the preselection process for a simplified network. Network 900 has a plurality of feeders 915a to 915f. The present current load of each feeder is indicated in the respective box (e.g., feeder 915b has a load of 100 A). FCIs are provided throughout network 900, shown as open circles if operating normally, or as shaded if a fault current is indicated. A fault has occurred in network 900, the location of which is indicated by fault indication 992. Due to the location of the fault, FCIs 9214a, 9214b and 9214c each indicate fault current. In the illustrated example, feeder 915a is treated as the source and feeders 915b to 915f are the alternate sources, however it will be appreciated that in other cases any of feeders 915b to 915f may be the source, with the remaining feeders as alternate sources.

As can be seen in network 900, a number of virtual paths VP1 to VP5 have been identified. Virtual path VP1 passes through only one FCI that indicates a fault, FCI 9214a. Virtual path VP2 passes through two FCIs that indicate faults, FCIs 9214a and 9214b. However, virtual paths VP3, VP4 and VP5 each pass through three FCIs that indicate a fault, namely VC's 9214a, 9214b and 9214c. Accordingly, virtual paths VP3, VP4 and VP5 may be preselected.

Referring again to FIG. 6, at 630, the controller may compare the distance to the fault, as estimated based on data from FCIs in the circuit, with distance estimated by the feeder protection relay that tripped the circuit breaker. If the distances are substantially similar, then the controller may proceed to 635. If the distances differ, this may indicate a problem with the FCI data, or with distance estimation from the feeder protection relay, and manual intervention may be required. Alternatively, the controller may attempt to isolate additional nodes, working backwards to the feeder source from the deepest fault, until the estimated distances are substantially similar.

At 635, the controller may evaluate each of the preselected virtual paths that involves the fault and select an operative restoration path. Various factors, such as current-bearing capacity, loads, or other operational reasons, may be evaluated when selecting the restoration path. For example, in the example of FIG. 9, virtual path VP4 may be preferred over virtual paths VP3 or VP5, since the present current load at feeder 915e is lower than at feeder 915d or 915f.

At 640, a progressive load restoration process may be determined to restore all segments of the restoration path. For example, the load restoration process may involve opening one or more switches along the restoration path, and closing sequentially after a predetermined delay, to avoid inrush currents or other anomalies that could create another fault condition.

At 645, the controller may verify or confirm that the fault is indeed isolated.

At 650, power can be restored to the circuit by closing the tripped circuit breaker, and the open switches along the restoration path can be closed in accordance with the load restoration process as determined at 640.

According to the described embodiments, each virtual path has one source circuit breaker and one alternate circuit breaker. However, in general, any circuit breaker may be either the source or alternate source in a virtual path. A variety of combinations are possible, which depend on the location and nature of the fault. For example, a given source for a faulted circuit segment may, in other circumstances, be the alternate source for a virtual path if the fault occurs in a different network location.

Figure 7A:
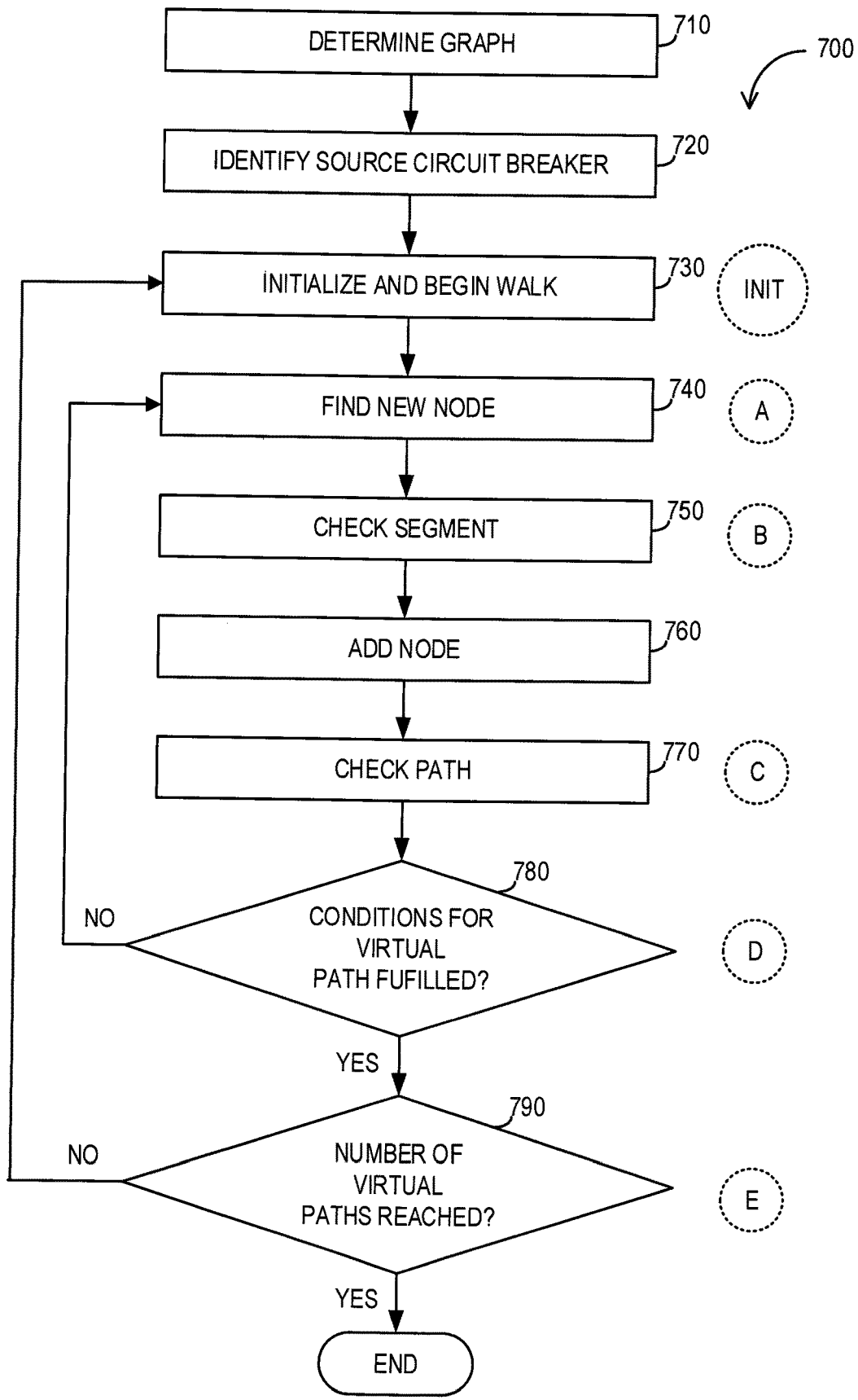
FIG. 7A is a process flow diagram for an example method of determining virtual paths within an electrical power distribution network in accordance with at least some of the described embodiments.

Referring now to FIG. 7A, there is illustrated a process flow diagram for an example method of determining virtual paths within an electrical power distribution network in accordance with at least some of the described embodiments. Method 700 may be used in conjunction with methods 500 or 600. For example, method 700 may be carried out at 520 of method 500, or at 610 of method 600.

At 710, the electrical power distribution network is represented as a graph. Each node within the network may be classified according to its connectedness or degree, as described herein. That is, nodes may be characterized by the number of edges or segments to which they are connected. Generally, each edge represents a degree. Therefore, a node connected to one segment is described as a node of degree one. A node connecting two segments is described as a node of degree two. Similarly, nodes connecting three segments are described as nodes of degree three, and so on. Nodes connecting four or more links can be characterized as nodes of four or more, respectively. However, nodes of degree four or more can be reduced conceptually to multiple nodes of degree three. That is, a node of degree four can be reduced to two nodes of degree three.

At 720, the tripped circuit breaker may be determined and classified as a source circuit breaker. The source circuit breaker can be considered a node of degree one, and forms the first node to be explored in each candidate virtual path.

At 730, initialization can be performed and the controller may begin to walk the graph. In some embodiments, the controller may use a breadth first search, initially searching for the boundaries of open segments. Initialization can also involve resetting various internal counters and flags used by the controller to trace virtual paths. Flags can include visited node flags, and direction selections at T-nodes (e.g., whether a path was traced left or right). Counters can include a number of tie segments, a number of end loads (also referred to as end nodes) before a tie segment, a number of T-nodes before a tie switch, and a number of virtual paths.

At 740, beginning from a base node (initially the first node of the source circuit breaker), the controller can explore the graph to locate any new, unvisited neighboring node.

At 750, if a previously unvisited neighboring node is encountered, it is marked as the current node. The controller can determine whether the segment between the base node and the current node is a tie segment (a segment terminated at an open load switch). If the segment is a tie segment, and if the current candidate virtual path being explored is within the number of permitted tie segments (e.g., zero other tie segments if only one tie segment is permitted per virtual path, one other tie segment if up to two tie segments are permitted per virtual path, etc.), then the tie segment is added to the current candidate virtual path and marked as such. If the current candidate virtual path being search already includes the maximum permitted amount of tie segments, the virtual path may be abandoned, thereby simplifying the scope of the search.

At 760, assuming the search has not been abandoned at 750, the current node is marked as visited and added to the current candidate virtual path. If the current node is not an end node, it is marked as the new base node.

At 770, various conditions for identifying a valid virtual path can be evaluated, as described further herein.

At 780, if the conditions are not fulfilled, the search may return to 740 to continue searching. If the conditions are fulfilled, then the number of known virtual paths can be deterministically verified at 790 as described herein. If all available virtual paths have been identified, the sub-process may end. Otherwise, the controller may return to 730 to continue searching further.

Method 700 follows one example process flow for finding available virtual paths, however other variations can be used. In general, however, virtual paths should maintain the requirement for only one tie segment per virtual path, to reduce the scope of the search and make it feasible as a real-time operation in large networks.

Accordingly, virtual paths can generally be traced beginning from the tripped source circuit breaker and ending at another circuit breaker. Each virtual path has only one tie switch and, correspondingly, each tie switch involved in the interrupted feeder is crossed by only one valid virtual path.

Figure 7B:
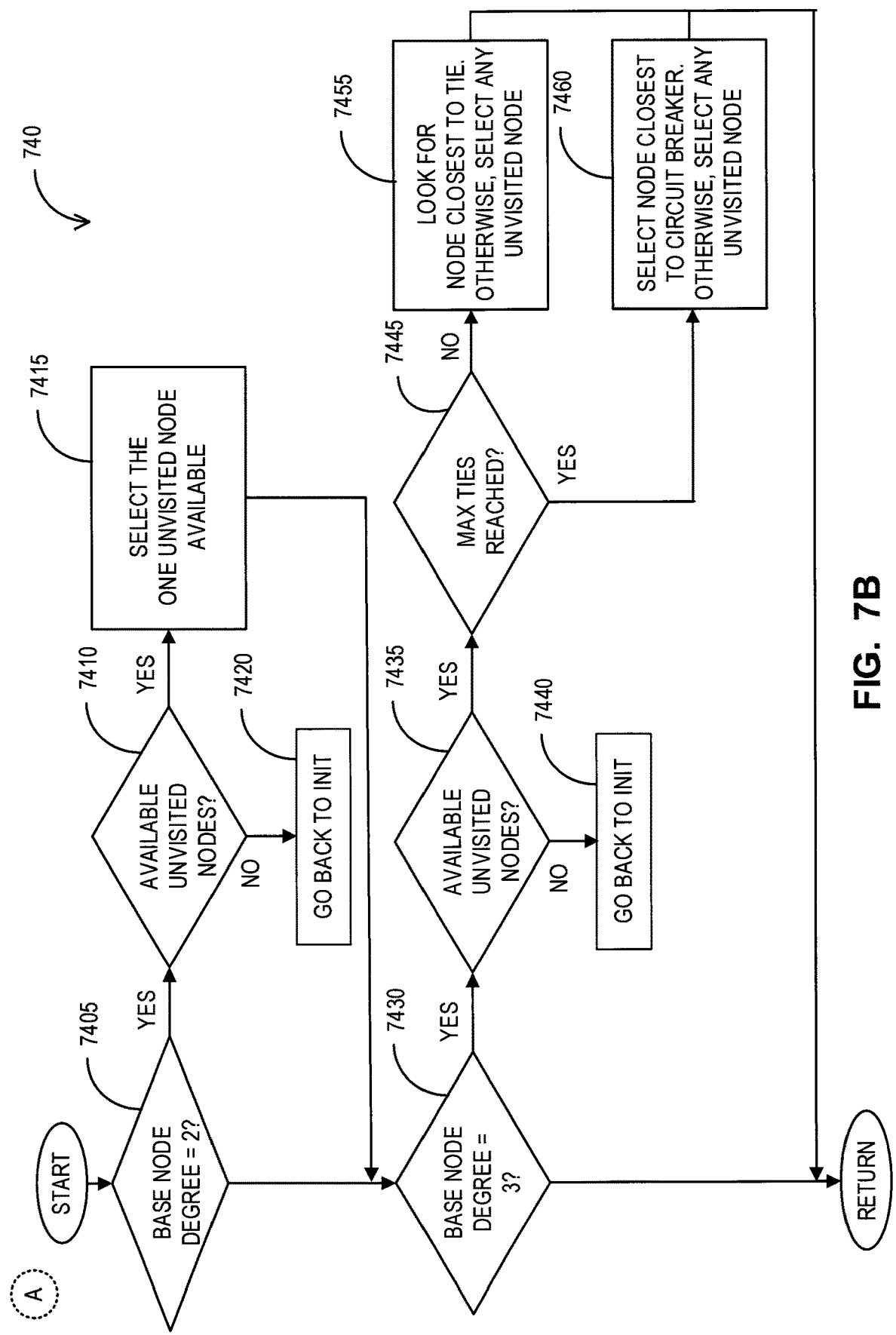
FIG. 7B is a process flow diagram for a sub-process of finding a new node for a method as in FIG. 7A.

Referring now to FIG. 7B, there is illustrated a process flow diagram for a sub-process of finding a new node, which can be used in conjunction with a method of determining virtual paths within an electrical power distribution network. For example, the illustrated process can be carried out at 740 of method 700 in FIG. 7A.

At 7405, the controller determines whether the current base node has a degree of two. If yes, the controller proceeds to 7410 to determine if it has an unvisited neighboring node. If no unvisited neighboring node is available, the process may end and return to an initialization stage (e.g., return to 730 of method 700).

If an unvisited neighboring node is found, it is selected at 7415, and the sub-process may end and return to method 700.

At 7430, if the base node was not of degree two, the controller may determine whether the base node has degree three. If yes, the controller may determine whether there are any unvisited neighboring nodes at 7435. If none exist, the sub-process may end at 7440.

If there are unvisited neighboring nodes, the controller can determine whether the current candidate virtual path being explored has reached the maximum permitted tie segments. If the maximum number of tie segments in the current candidate virtual path has not been reached, the controller may prefer to visit a neighboring node that is adjacent a tie segment at 7455. If no tie segment is adjacent, any unvisited neighboring node can be selected, and the sub-process can return to method 700.

If the maximum number of permitted tie segments in the current virtual path has been reached, the controller may prefer to visit a neighboring node that is adjacent a circuit breaker. If no circuit breaker is adjacent, any unvisited neighboring node can be selected, and the sub-process can return to method 700.

Figure 7C:
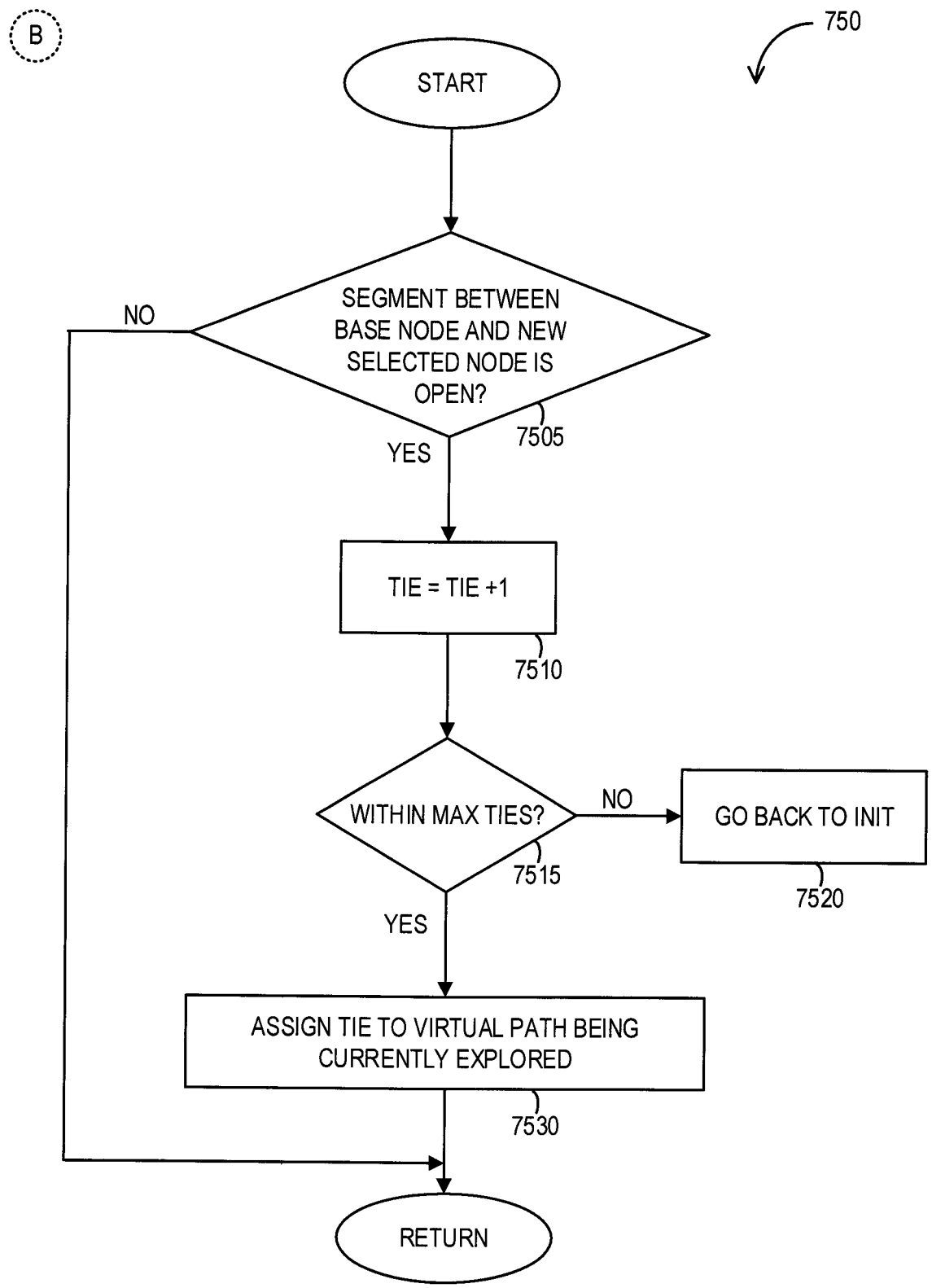
FIG. 7C is a process flow diagram for a sub-process of checking a segment between a base node and a current node for a method as in FIG. 7A.

Referring now to FIG. 7C, there is illustrated a process flow diagram for a sub-process of checking a segment between a base node and a current node, which can be used in conjunction with a method of determining virtual paths within an electrical power distribution network. For example, the illustrated process can be carried out at 750 of method 700 in FIG. 7A.

At 7505, the controller determines whether the segment between the base node and the current node has a tie switch that is open. If the segment has an open tie switch, a tie segment counter may be incremented at 7510.

At 7515, the controller can determine whether the tie segment counter is less than or equal to the permitted maximum number of tie segments (e.g., one tie segment in a first order restoration process, two tie segments in a second order restoration process). If the tie segment counter is less than or equal to the permitted maximum number of tie segments, the tie segment can be marked as assigned to the candidate virtual path currently being explored at 7530, and the sub-process can return to method 700. Otherwise, the controller can abandon the current candidate virtual path being explored (since the number of tie segments exceeds the permitted maximum) and return to an initialization stage at 7520 (e.g., return to 730 of method 700).

Figure 7D:
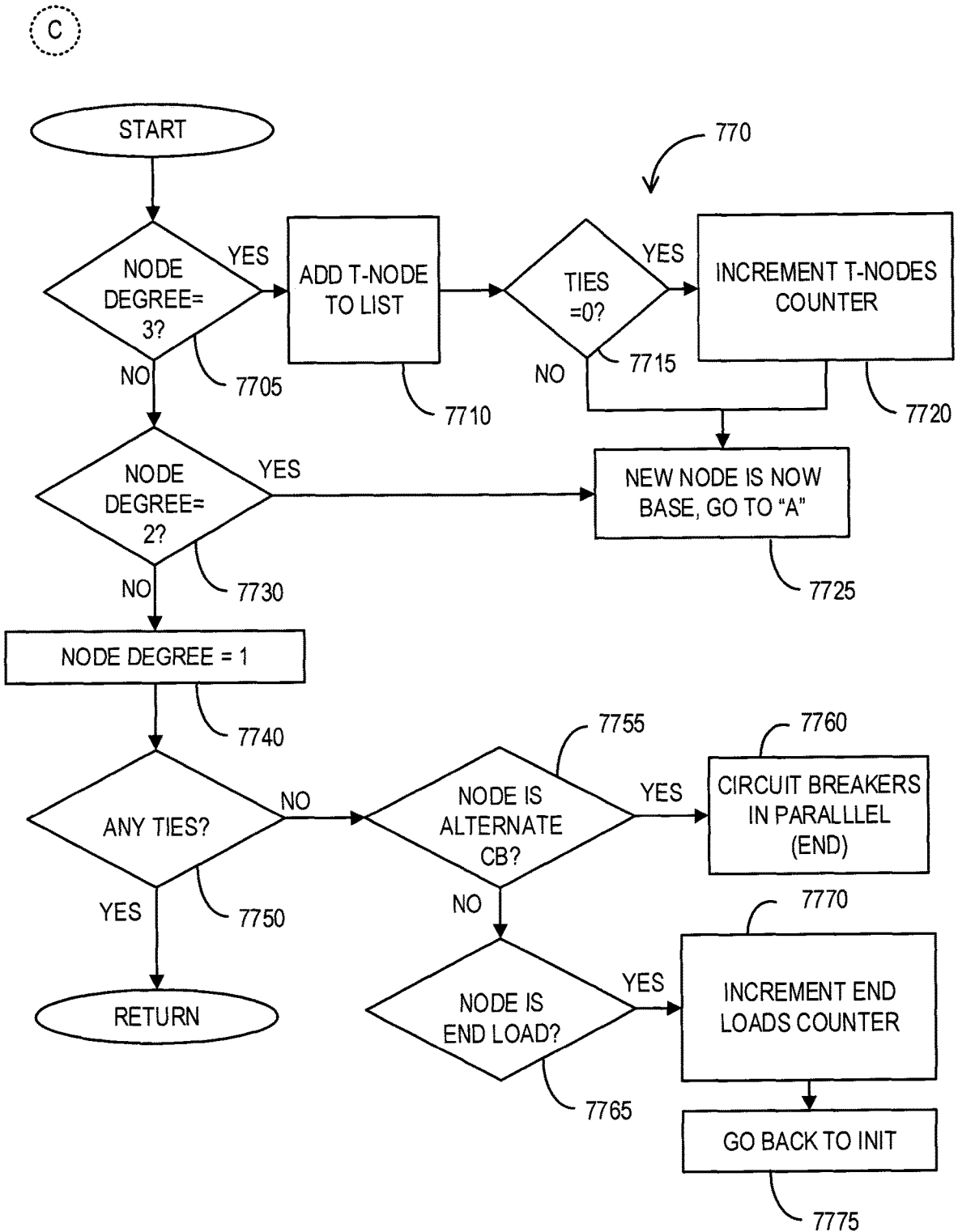
FIG. 7D is a process flow diagram for a sub-process of checking a path for a method as in FIG. 7A.

Referring now to FIG. 7D, there is illustrated a process flow diagram for a sub-process of checking a path, which can be used in conjunction with a method of determining virtual paths within an electrical power distribution network. For example, the illustrated process can be carried out at 770 of method 700 in FIG. 7A.

At 7705, the degree of the new base node is checked to determine if it equals three. If the new base node has a degree of three, then it is a T-node and may be added to a list or vector of T-nodes at 7710. This list can be referenced in further searches when determining a direction to traverse the path.

At 7715, the number of tie segments in the current candidate virtual path being explored is checked. If there is a tie segment in the current candidate virtual path being explored, then the sub-process can end and return to further exploration from the new base node (e.g., return to 740 of method 700).

If there are no tie segments in the current candidate virtual path being explored, then a counter of the number of T-nodes before a tie segment can be incremented at 7720. This counter can be used upon the completion of exploration to verify deterministically that the correct number of virtual paths has been identified. The sub-process can then end and return to further exploration from the new base node (e.g., return to 740 of method 700).

At 7730, the degree of the new base node is checked to determine if it equals two. If yes, then the sub-process can end and return to further exploration from the new base node (e.g., return to 740 of method 700).

If not, the degree of the new base node is verified to be one, at 7740. A number of tie segments in the current candidate virtual path being explored is verified at 7750. If the number of tie segments is zero, then a determination can be made at 7755 whether the new base node is an alternate source circuit breaker. If the new base node is an alternate source circuit breaker, then the current candidate virtual path being explored is abandoned at 7760, and the sub-process returns to method 700. This is because if no open tie segments exist, then the alternate source circuit breaker is connected in parallel with the tripped source circuit breaker, which generally is not permitted.

If the new base node is not an alternate source circuit breaker, then the new base node is verified as an end load (e.g., customer load) at 7765, a counter of end loads before a tie segment is incremented at 7770 and the sub-process can then end at 7775 and return to an initialization stage (e.g., return to 730 of method 700). The counter of end loads before a tie segment can be used upon completion of exploration to verify deterministically that the correct number of virtual paths has been identified.

Figure 7E:
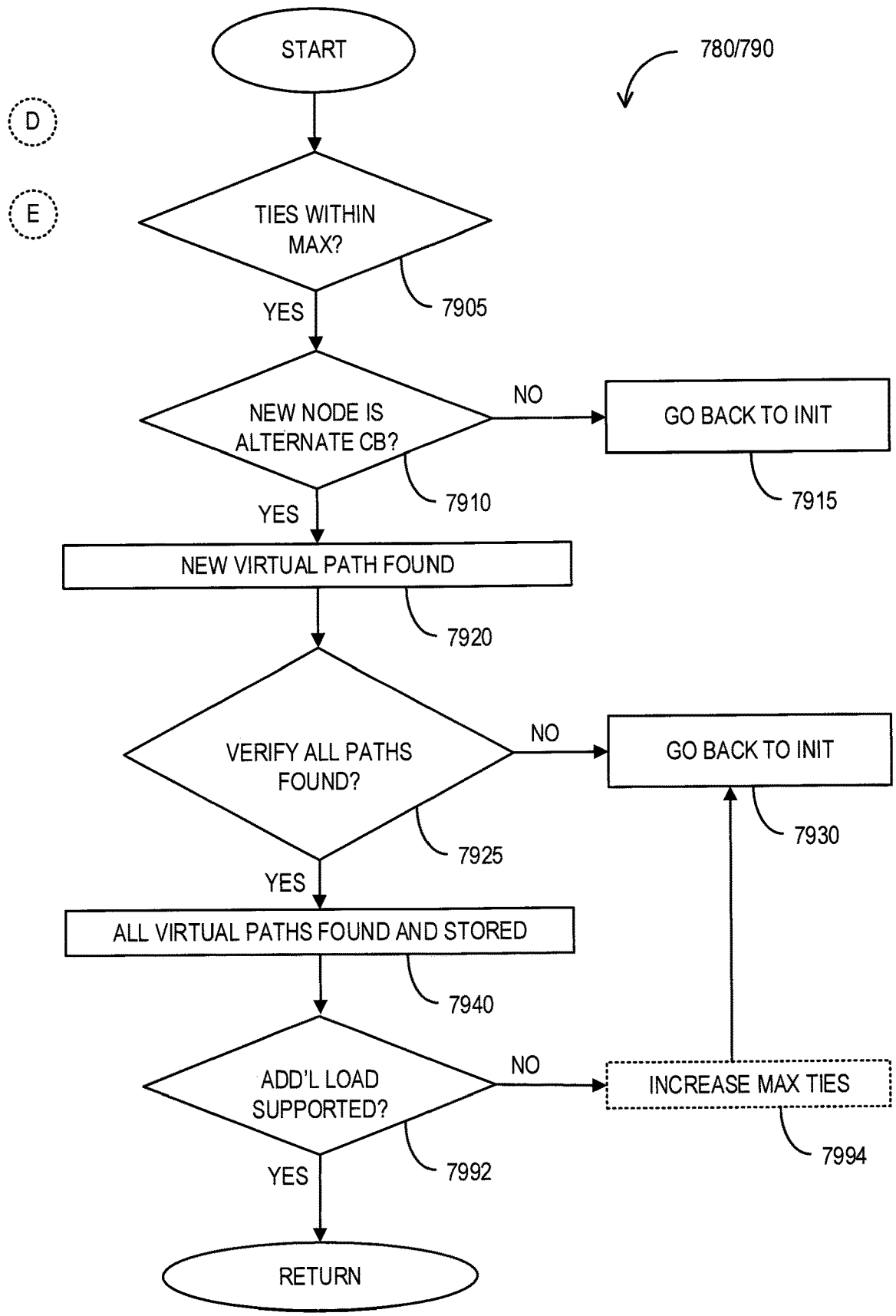
FIG. 7E is a process flow diagram for a sub-process of verifying paths for a method as in FIG. 7A.

Referring now to FIG. 7E, there is illustrated a process flow diagram for a sub-process of verifying paths, which can be used in conjunction with a method of determining virtual paths within an electrical power distribution network. For example, the illustrated process can be carried out at 780 and 790 of method 700 in FIG. 7A.

At 7905, the number of tie segments in the current candidate virtual path being explored can be verified as (less than or) equal to the maximum permitted number of tie segments in a virtual path (e.g., one for a first order restoration process).

At 7910, the controller determines whether the new base node is an alternate source circuit breaker, of an alternate feeder. If the new base node is not an alternate source circuit breaker, the sub-process may end at 7915 and return to an initialization stage (e.g., return to 730 of method 700).

If the new base node is an alternate source circuit breaker, the controller may determine that a new, valid virtual path has been identified, and the sequence of nodes forming the virtual path may be stored in a memory at 7920. A number of valid virtual paths can also be incremented.

At 7925, the controller may verify whether all available virtual paths have been identified. For example, in some embodiments, the number of all available virtual paths can be determined by subtracting the number of end loads (end nodes) before a tie segment from the number of T-nodes (branch nodes) before a tie segment, and adding one. This can be expressed as the formula B−E+1, where B is the number of T-nodes before a tie segment and E is the number of end loads. If the number of valid virtual paths (e.g., as counted at 7920) equals the number of available virtual paths, then the controller may determine that all available virtual paths have been identified at 7940.

Once all available virtual paths have been identified, the controller may further determine whether any of the available virtual paths is able to support the additional load that will be imposed on the respect power sources once the virtual path is activated. For example, a power source for a selected virtual path may be at or near its maximum capacity prior to switching to introduce additional load. In such cases, the virtual path may be eliminated from consideration. If all available virtual paths are eliminated, a second order search may be used. Accordingly, at 7992, the controller may verify whether any of the virtual paths can support the additional load and, if yes, return to method 700. Otherwise, the sub-process may optionally increase the permitted maximum number of tie segments at 7994 and return to an initialization stage at 7930 (e.g., return to 730 of method 700).

Referring now to FIGS. 8A to 8D, there is illustrated an example network in a progression of fault recovery states. Network 800 is an example electrical power distribution network with a mesh topology. Network 800 has one or more substations 810, which may in some cases be different busses provided by a single substation 810, multiple feeders 815, and RTUs 820 (which comprise load switches 8214 and monitors 8216, with each RTU controlling its load switches and receiving information from its monitors).

Figure 8A:
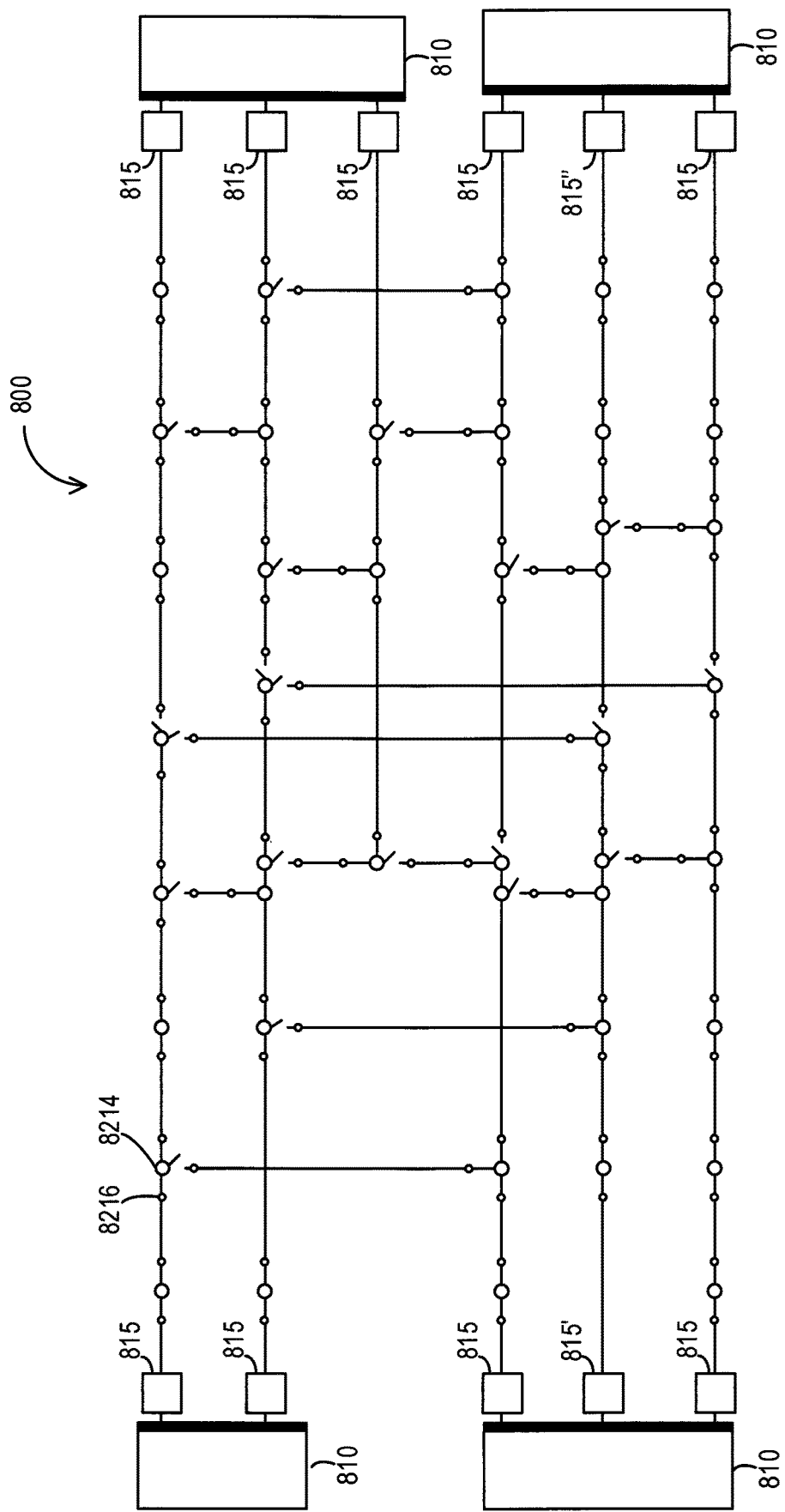
FIG. 8A is a schematic diagram of an example network in a normal state.

FIG. 8A illustrates the example network 800 in a normal operating state. It can be observed that a number of tie load switches 8214 are in an open state in the normal operating state.

Figure 8B:
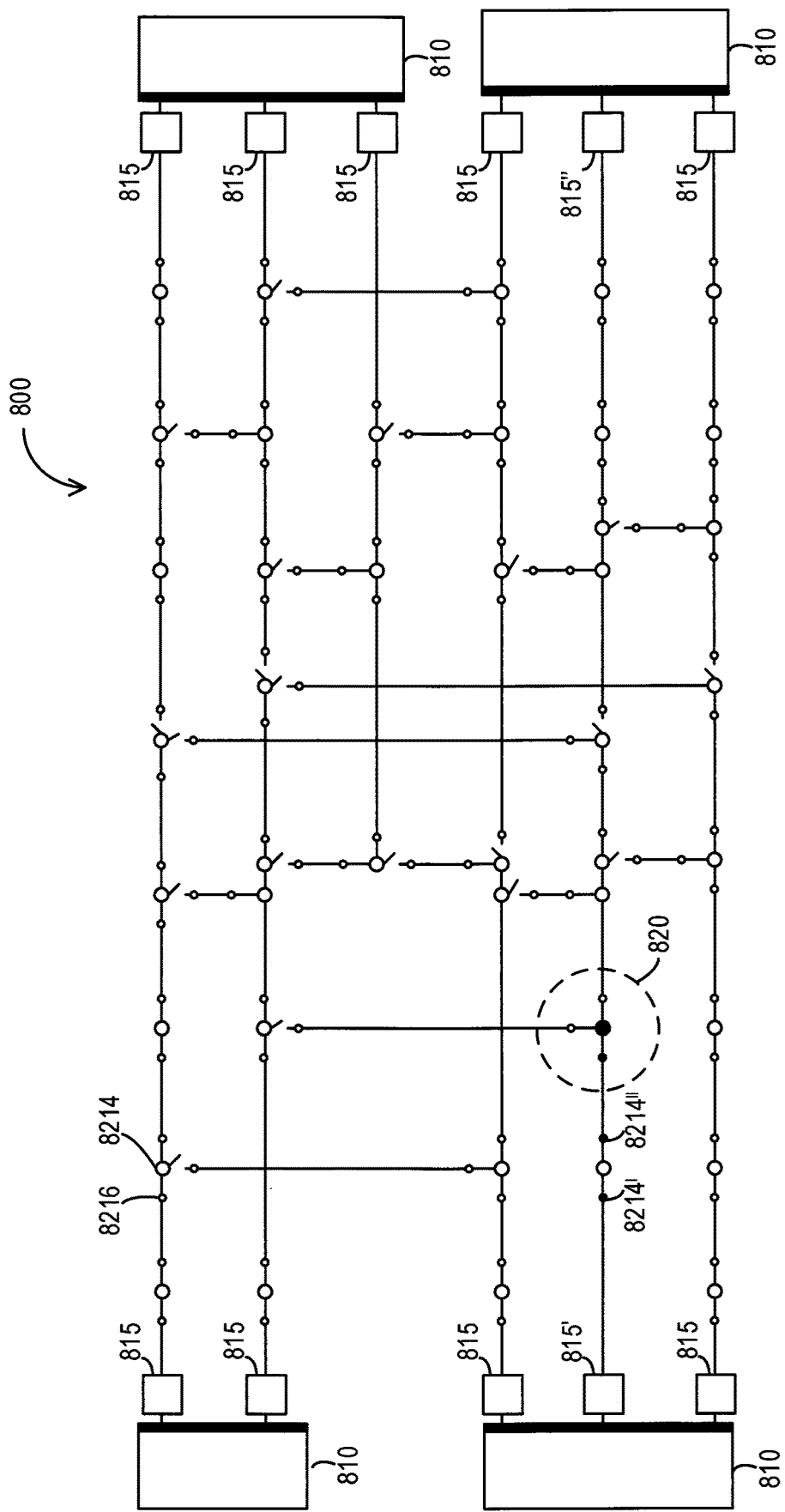
FIG. 8B is a schematic diagram of the example network of FIG. 8A in an interrupted state.

FIG. 8B illustrates the example network 800 in an interrupted or fault state. It can be observed that an RTU 820' is reporting a fault (indicated by dark shading). Similarly, FCIs 8214' and 8214" of an intermediate RTU are also reporting fault current. Accordingly, a circuit breaker at feeder 815' is tripped, isolating the circuit segments that are electrically contiguous with the fault.

Figure 8C:
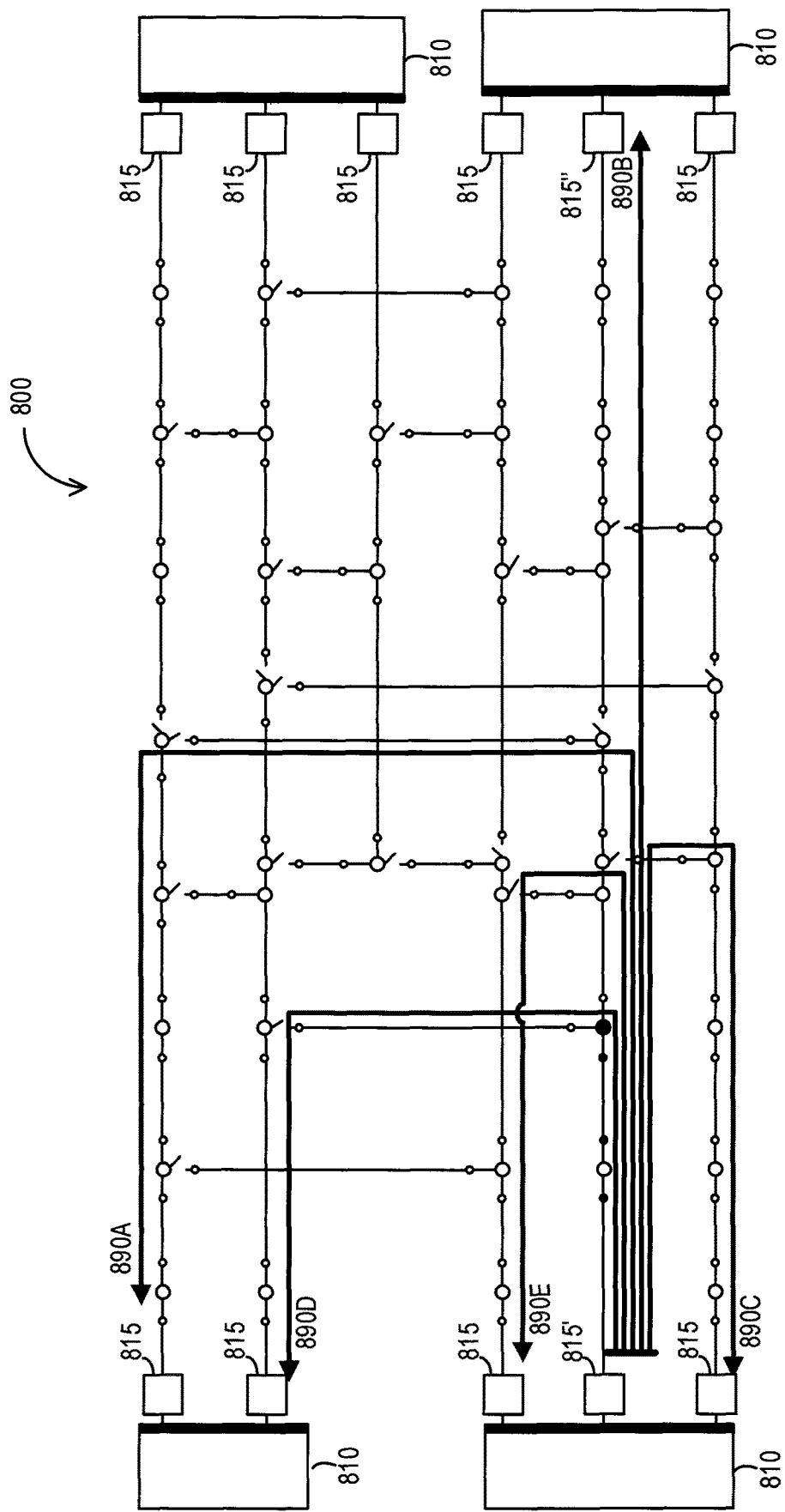
FIG. 8C is a schematic diagram of virtual paths for the example network of FIG. 8B.

FIG. 8C illustrates the five possible virtual paths 890A to 890E that can be identified, e.g., using method 700 of FIG. 7A using a first order restoration process.

Figure 8D:
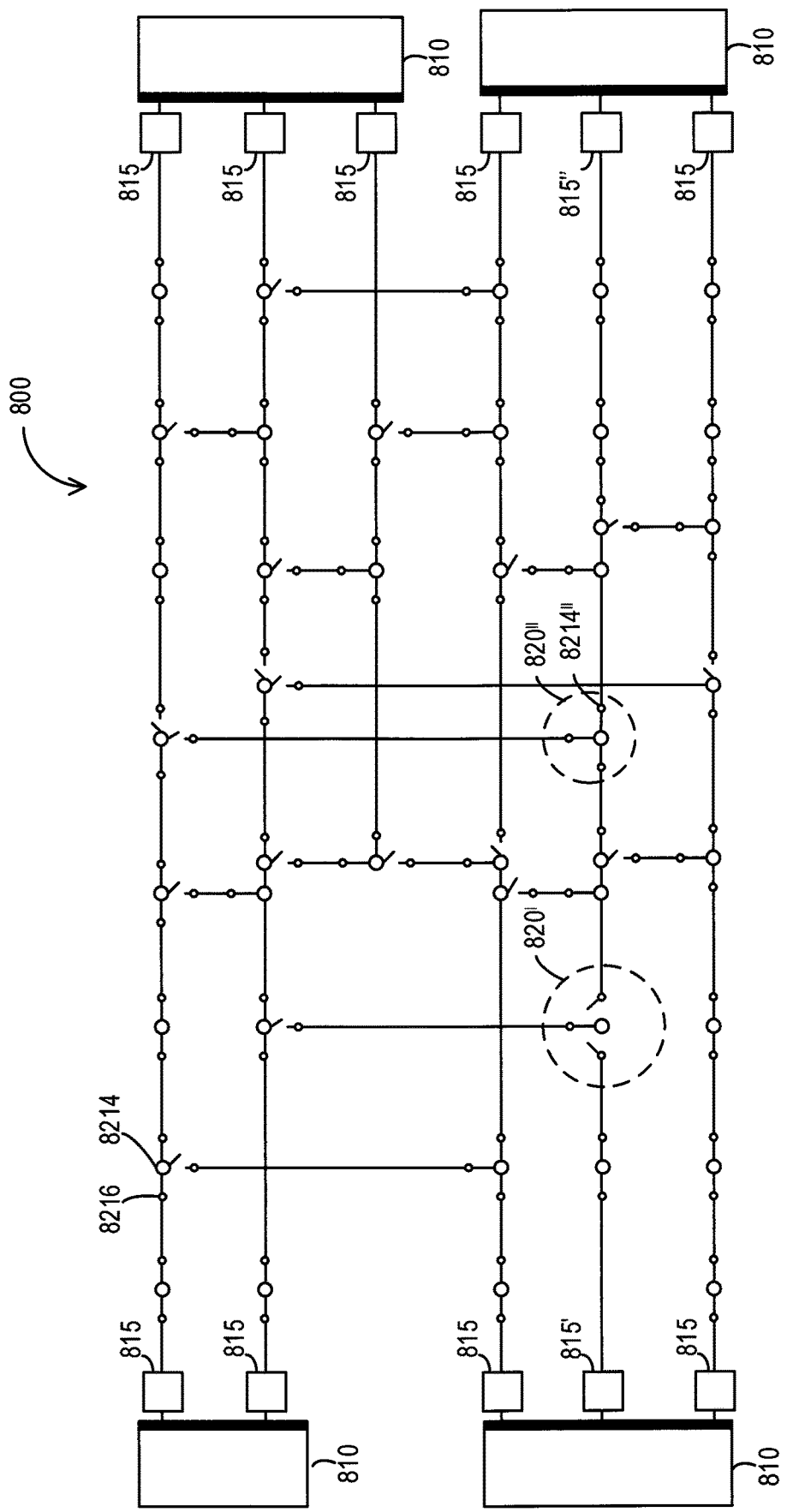
FIG. 8D is a schematic diagram illustrating control actions taken to activate a virtual path as shown in FIG. 8C.

FIG. 8D illustrates the control actions taken by the controller when virtual path 890B is selected as the restoration path. In particular, load switches controlled by RTU 820' are opened to isolate the fault and allow power to be restored to the remainder of the network. Load switch 8214" at RTU 820" is closed, to allow feeder 815" to supply nodes up to the fault at RTU 820'. Feeder 815' can supply the intervening node between the feeder and the fault at RTU 820'. Therefore power can be restored to the entire network 800, with the exception of the fault which is isolated.

Referring now to FIGS. 10A to 10D, there is illustrated an example network in a progression of fault recovery states. Network 1000 is an example electrical power distribution network with a mesh topology. As with network 800, network 1000 has one or more substations (which may in some cases be different busses provided by a single substation), multiple feeders 1015, RTUs, load switches and monitors. To ease exposition, only feeders and load switches are illustrated, although it will be understood that other network elements are present and operating in known manner.

Figure 10A:
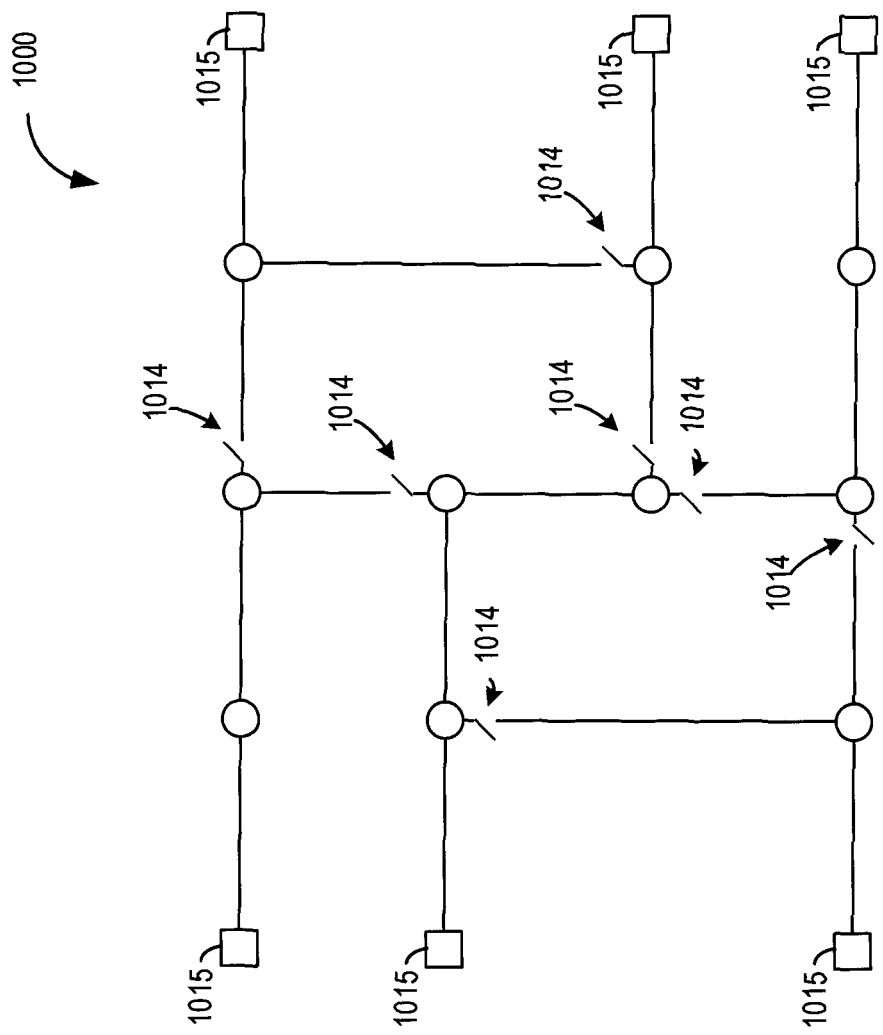
FIG. 10A is a schematic diagram of another example network in a normal state.

FIG. 10A illustrates the example network 1000 in a normal operating state. It can be observed that a number of tie load switches 1014 are in an open state in the normal operating state.

Figure 10B:
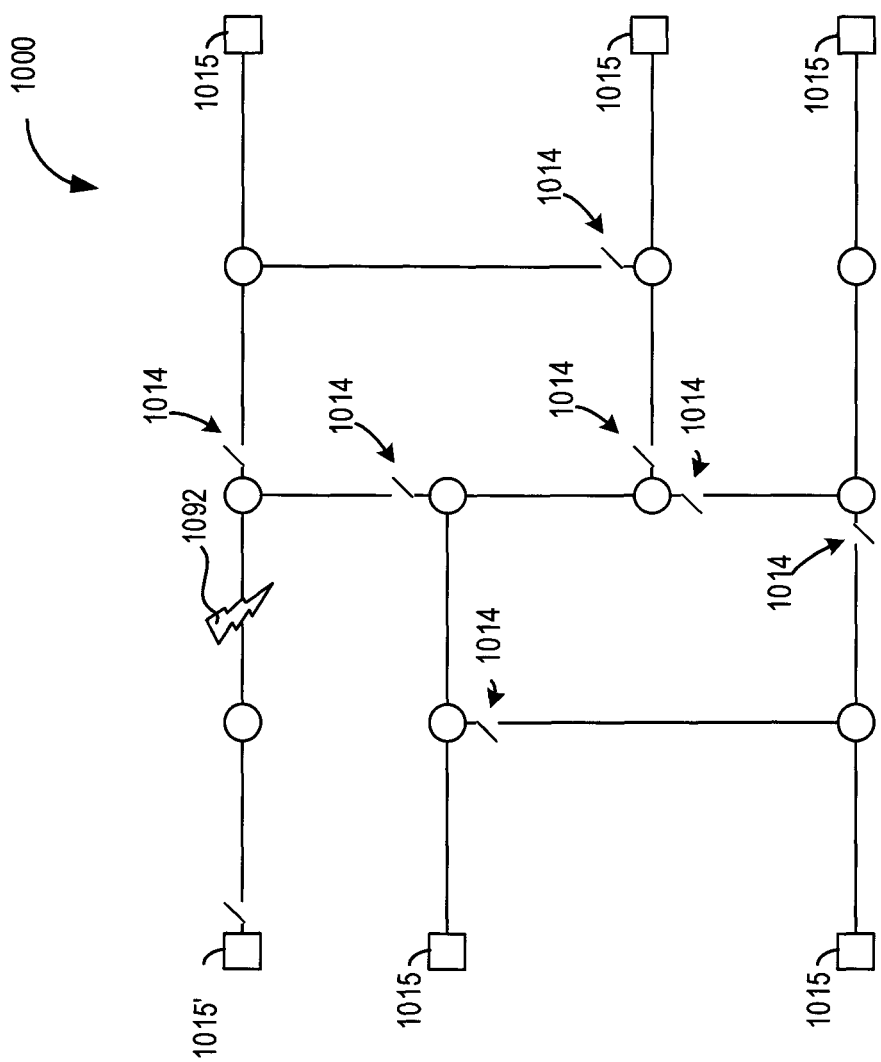
FIG. 10B is a schematic diagram of the example network of FIG. 10A in an interrupted state.

FIG. 10B illustrates the example network 1000 in an interrupted or fault state. It can be observed that a fault has occurred at the location of fault indicator 1092 (e.g., which may be reported by an RTU, not shown). Accordingly, a circuit breaker at feeder 1015' is tripped, isolating the circuit segments that are electrically contiguous with the fault.

Figure 10C:
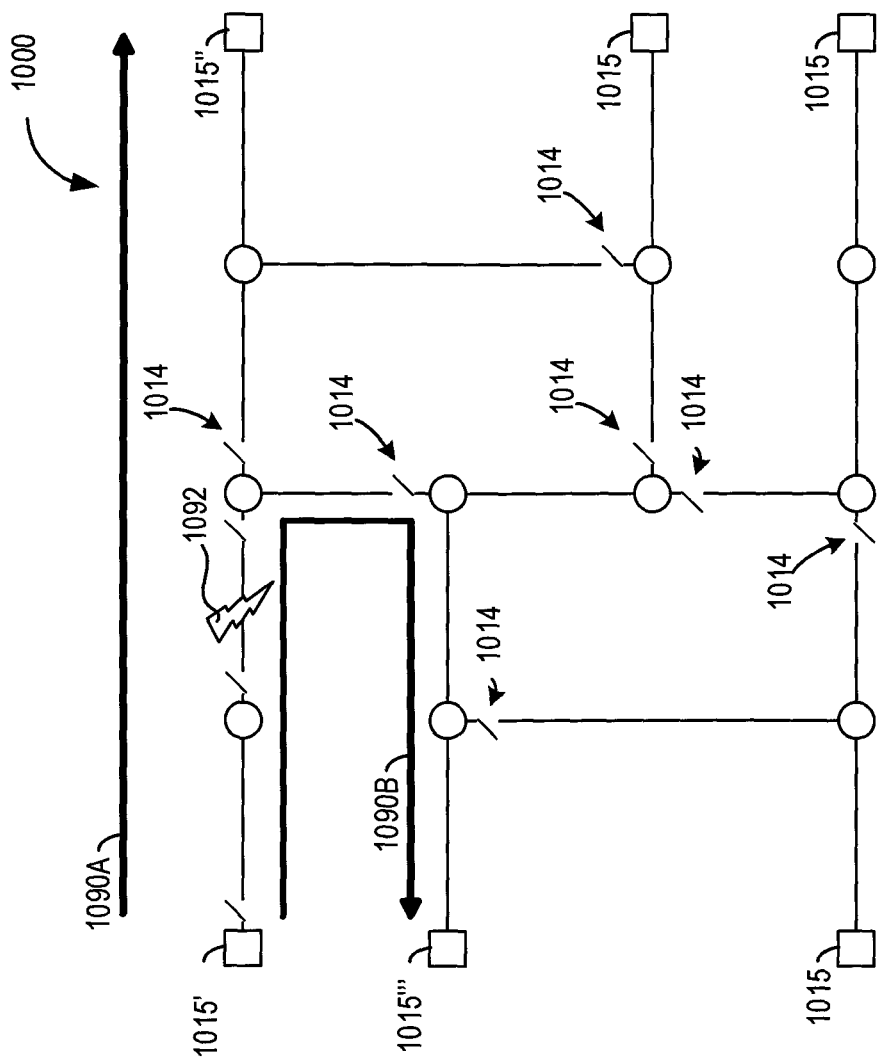
FIG. 10C is a schematic diagram of first order virtual paths for the example network of FIG. 10B.

Next, the faulted component may be located in the network and more narrowly isolated with local load switches, and a first order restoration process can be initiated. FIG. 10C illustrates the two possible first order virtual paths 1090A and 1090B that can be identified using a first order restoration process, e.g., using method 700 of FIG. 7A with the maximum permitted number of tie segments set to one. However, in this example, neither of feeders 1015" and 1015''' is capable of supporting additional loads, therefore a second order restoration process may be engaged, or otherwise the restoration process may end with only fault isolation (leaving some nodes without power).

Figure 10D:
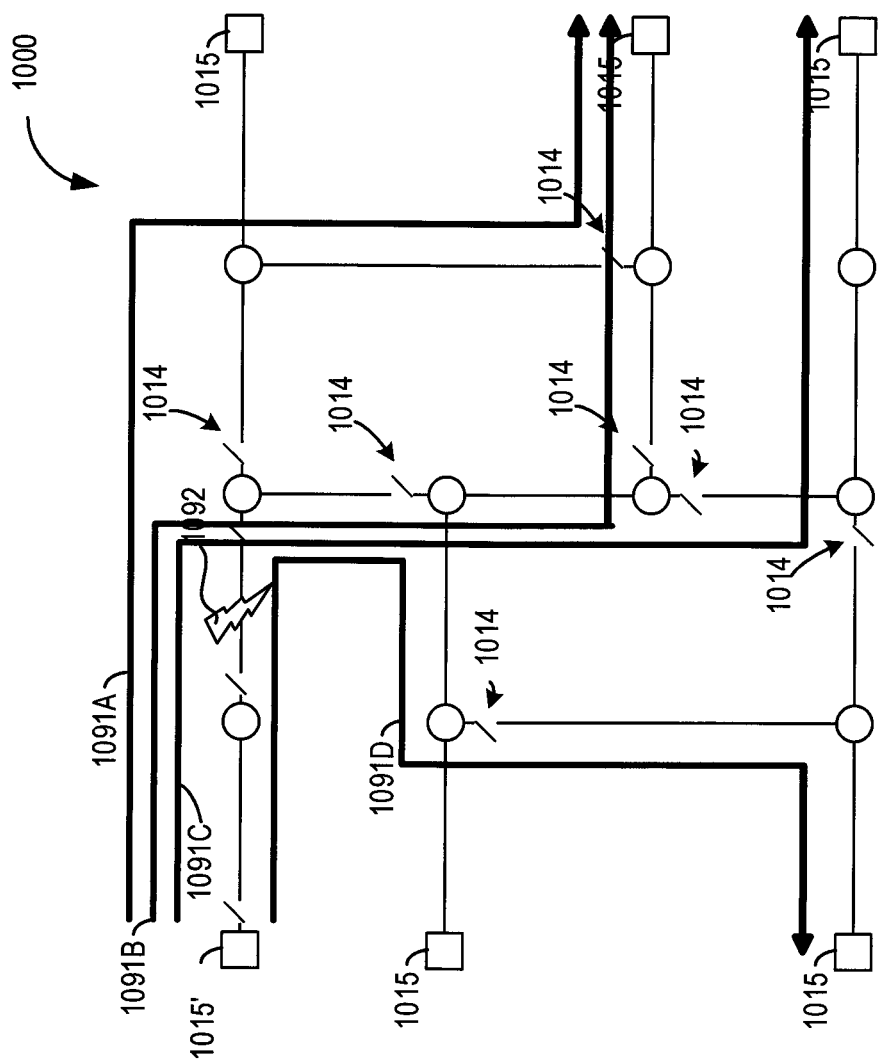
FIG. 10D is a schematic diagram of second order virtual paths for the example network of FIG. 10B.

FIG. 10D illustrates the four possible second order virtual paths 1091A to 1091D that can be identified using a second order restoration process, e.g., using method 700 of FIG. 7A with the maximum permitted number of tie segments set to two.

Once a suitable virtual path is found using the second order restoration process (e.g., second order virtual path 1091D involving feeder 1015*), the controller may attempt to create a load transfer solution. Generally, the load transfer solution may seek to create a network condition that avoids parallel sources and that satisfies load requirements.

Figure 10E:
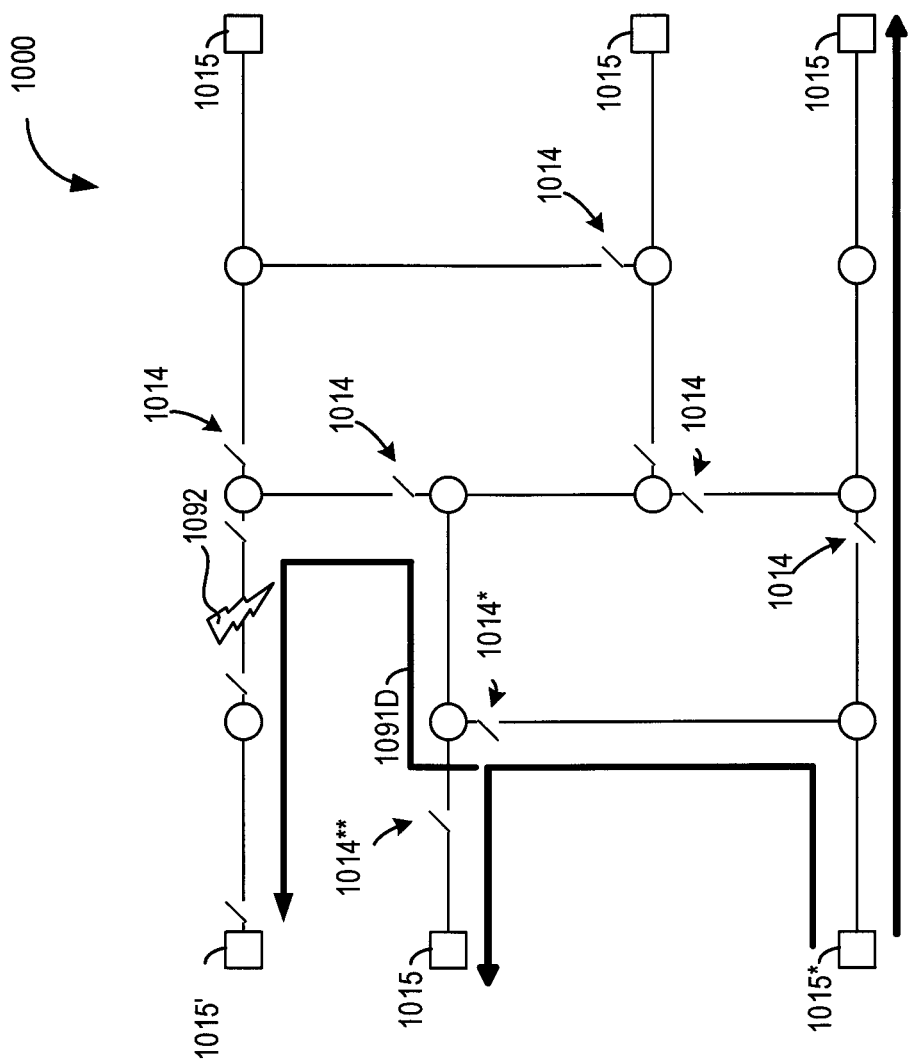
FIG. 10E is a schematic diagram illustrating control actions taken to activate a virtual path as shown in FIG. 10D.
Figure 10F:
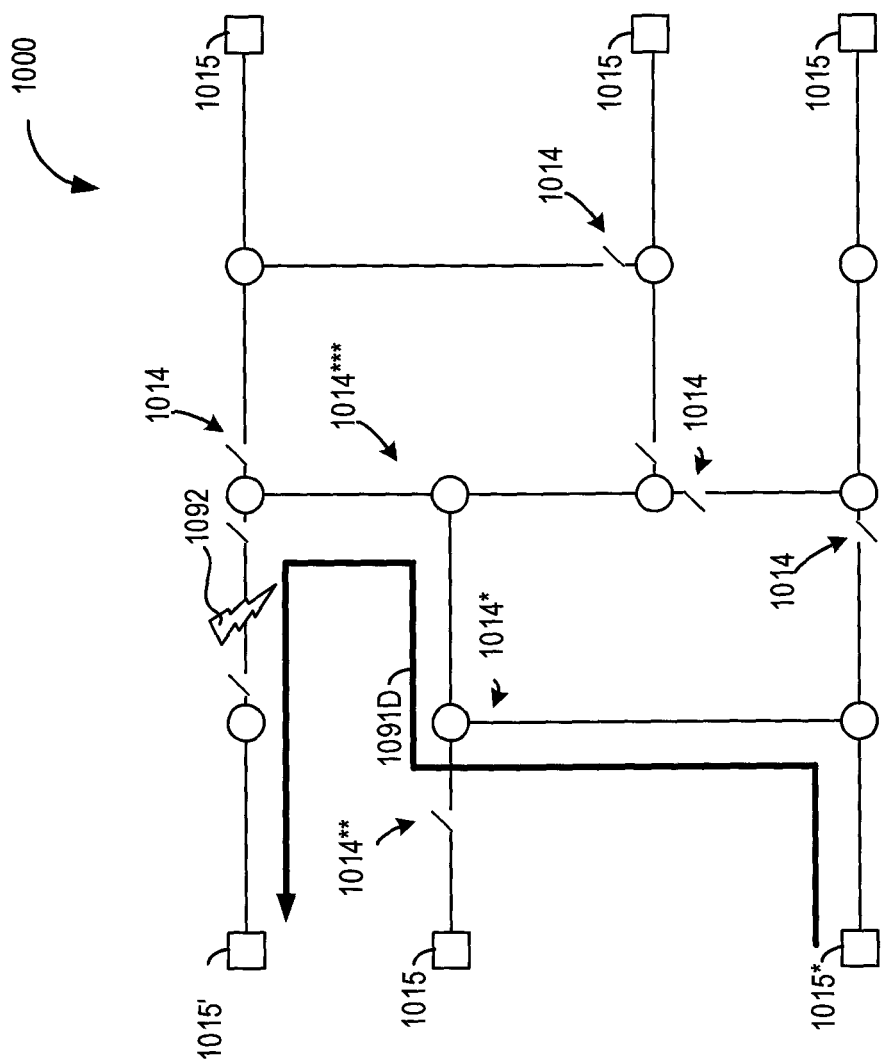
FIG. 10F is a schematic diagram illustrating additional control actions taken to activate the virtual path as shown in FIG. 10E.

Identifying a load transfer solution can be performed by: 1) determining all possible second order and first order virtual paths involving the selected feeder (e.g., feeder 1015*); 2) identifying the tie segment that is common to both the second order and first order virtual paths for the selected feeder (e.g., the tie segment that contains load switch 1014*); 3) starting from the selected feeder (e.g., feeder 1015*), opening the load switch (e.g., load switch 1014**) that is downstream of the T-node that follows the common tie segment (e.g., load switch 1014*), as illustrated in FIG. 10E; and 4) closing the load switch for the common tie segment (e.g., load switch 1014*) and other tie segment (e.g., load switch 1014***), preferably in order from the selected power source, in the selected second order virtual path 1091D. The completed network configuration is illustrated in FIG. 10F.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

I claim:

1. A method of fault recovery in an electrical power distribution network having a plurality of electrical power sources in a mesh configuration, the method comprising:
   determining that a first electrical power source of the electrical power distribution network is in a non-conductive state;
   tracing a plurality of virtual paths, each virtual path in the plurality of virtual paths originating at the first electrical power source, each virtual path in the plurality of virtual paths terminating with a respective electrical power source of the plurality of electrical power sources, and each virtual path in the plurality of virtual paths comprising at least one tie switch associated therewith, each at least one tie switch pre-configured to a non-conductive state prior to the determining, wherein tracing the plurality of virtual paths comprises imposing a constraint on a permitted maximum number of tie switches in each virtual path;
   selecting a restoration path from the plurality of virtual paths, the restoration path comprising a selected node or segment in the electrical power distribution network;
   electrically isolating the selected node or segment;
   restoring the first electrical power source to a conductive state; and
   configuring the at least one tie switch associated with the restoration path to the conductive state.

2. The method of claim 1, wherein the permitted maximum number of tie switches is exactly one.

3. The method of claim 1, wherein the permitted maximum number of tie switches is two.

4. The method of claim 1, wherein restoring the first electrical power source to a conductive state comprises closing a circuit breaker of the first electrical power source.

5. The method of claim 1, wherein the respective electrical power source is selected from a plurality of alternate electrical power sources.

6. The method of claim 1, further comprising detecting a fault at the selected node or segment prior to selecting the restoration path, and wherein the restoration path is selected based on detection of the fault.

7. The method of claim 6, wherein the restoration path is selected based on detection of the fault.

8. The method of claim 6, wherein the fault is detected by a fault current indicator.

9. The method of claim 8, wherein the fault current indicator provides an estimated distance within the electrical power distribution network from the first electrical power source to the fault, further comprising verifying that the estimated distance corresponds within a tolerance to a computed distance between the first electrical power source and the fault.

10. The method of claim 8, wherein, when the estimated distance and the computed distance correspond within the tolerance, the configuration of the at least one load switch to the conductive state and the restoration of the first electrical power source to the conductive state are automatically performed.

11. The method of claim 1, wherein the restoration path is selected based on one or more load level of each respective alternate electrical power source.

12. The method of claim 1, further comprising verifying a quantity of the plurality of virtual paths.

13. The method of claim 12, wherein the verifying is performed according to the formula B−E+1, where B is a branch node count and E is an end node count.

14. The method of claim 1, wherein the first electrical power source has an associated circuit breaker, and wherein the first electrical power source is restored to the conductive state by closing the associated circuit breaker.

15. An apparatus for automatic fault recovery in an electrical power distribution network having a plurality of electrical power sources in a mesh configuration, the apparatus comprising a memory and a processor, the processor configured to:
   determine that a first electrical power source of the electrical power distribution network is in a non-conductive state;
   trace a plurality of virtual paths, each virtual path in the plurality of virtual paths originating at the first electrical power source, each virtual path in the plurality of virtual paths terminating with a respective alternate electrical power source of the plurality of electrical power sources, and each virtual path in the plurality of virtual paths comprising at least one tie switch associated therewith and pre-configured to a non-conductive state prior to the determining, wherein, when tracing the plurality of virtual paths, the processor is further configured to impose a constraint on a permitted maximum number of tie switches in each virtual path;
   select a restoration path from the plurality of virtual paths, the restoration path comprising a selected node or segment in the electrical power distribution network;
   electrically isolate the selected node or segment;
   configure the at least one tie switch associated with the restoration path to the conductive state; and
   restore the first electrical power source to a conductive state.

16. The apparatus of claim 15, wherein the processor is further configured to detect a fault prior to selecting the restoration path, and wherein the restoration path is selected based on detection of the fault.

17. The apparatus of claim 16, wherein the restoration path is selected based on detection of the fault.

18. The apparatus of claim 16, wherein the fault is detected by a fault current indicator.

19. The apparatus of claim 18, wherein the fault current indicator provides an estimated distance within the electrical power distribution network from the first electrical power source to the fault, and wherein the processor is further configured to verify that the estimated distance corresponds within a tolerance to a computed distance between the first electrical power source and the fault prior to configuring the at least one tie switch to the conductive state.

20. The method of claim 1, wherein at least one each virtual path in the plurality of virtual paths comprises at least one load switch pre-configured to a conductive state prior to the determining.

\* \* \* \* \*